US008307372B2

(12) United States Patent
Feblowitz et al.

(10) Patent No.: US 8,307,372 B2
(45) **Date of Patent: *Nov. 6, 2012**

(54) METHOD FOR DECLARATIVE SEMANTIC EXPRESSION OF USER INTENT TO ENABLE GOAL-DRIVEN INFORMATION PROCESSING

(75) Inventors: Mark D. Feblowitz, Winchester, MA (US); Nagui Halim, Yorktown Heights, NY (US); Zhen Liu, Tarrytown, NY (US); Anand Ranganathan, White Plains, NY (US); Anton V. Riabov, Ossining, NY (US)

(73) Assignee: International Business Machines Corporation, Armonk, NY (US)

(*) Notice: Subject to any disclaimer, the term of this patent is extended or adjusted under 35 U.S.C. 154(b) by 1196 days.

This patent is subject to a terminal disclaimer.

(21) Appl. No.: 11/695,279

(22) Filed: Apr. 2, 2007

(65) Prior Publication Data

US 2008/0243449 A1 Oct. 2, 2008

(51) Int. Cl.
*G06F 3/00* (2006.01)
*G06F 9/44* (2006.01)
*G06F 17/33* (2006.01)

(52) U.S. Cl. .......................... 719/310; 717/144; 707/808

(58) Field of Classification Search .................. 719/310; 707/808; 717/144

See application file for complete search history.

(56) References Cited

U.S. PATENT DOCUMENTS

| | | | | |
|---|---|---|---|---|
| 5,295,261 | A * | 3/1994 | Simonetti | 1/1 |
| 5,675,786 | A * | 10/1997 | McKee et al. | 1/1 |
| 6,102,968 | A | 8/2000 | Colby et al. | |
| 6,209,004 | B1 * | 3/2001 | Taylor | 715/236 |
| 6,346,879 | B1 | 2/2002 | Peled | |
| 6,640,231 | B1 | 10/2003 | Andersen et al. | |
| 6,662,354 | B1 | 12/2003 | Krablin et al. | |
| 7,016,910 | B2 | 3/2006 | Egilsson et al. | |
| 7,036,720 | B2 | 5/2006 | Mezard et al. | |
| 7,107,268 | B1 | 9/2006 | Zawadzki et al. | |
| 7,150,400 | B2 | 12/2006 | Melick et al. | |
| 7,155,720 | B2 | 12/2006 | Casati et al. | |
| 7,505,989 | B2 | 3/2009 | Gardner et al. | |
| 7,798,417 | B2 | 9/2010 | Snyder et al. | |
| 7,877,421 | B2 | 1/2011 | Berger et al. | |
| 7,904,545 | B2 | 3/2011 | Golovchinsky et al. | |
| 2003/0120642 | A1 | 6/2003 | Egilsson et al. | |
| 2003/0135628 | A1 | 7/2003 | Fletcher et al. | |
| 2003/0142818 | A1 | 7/2003 | Raghunathan et al. | |
| 2003/0149714 | A1 | 8/2003 | Casati et al. | |

(Continued)

OTHER PUBLICATIONS

Chun-nan Hsu, Semantic Query Optimization for Query Plans of Heterogeneous Multidatabase systems, Jan. 22, 1999.*

(Continued)

*Primary Examiner* — Lechi Truong

(74) *Attorney, Agent, or Firm* — F. Chau & Associates, LLC

(57) ABSTRACT

A method for constructing a processing request so that an information processing application satisfying the processing request can be assembled, includes: inputting a processing request, wherein the processing request includes a goal that is represented by a graph pattern that semantically describes a desired processing outcome; and assembling a processing graph that includes at least one component that satisfies the desired processing outcome, wherein the processing graph is assembled by associating the graph pattern that semantically describes the desired processing outcome with a graph pattern that semantically describes an applicability condition of the at least one component or a graph pattern that semantically describes an inclusion effect of the at least one component.

22 Claims, 10 Drawing Sheets

600

U.S. PATENT DOCUMENTS

| | | |
|---|---|---|
| 2004/0054690 A1 | 3/2004 | Hillerbrand et al. |
| 2004/0073545 A1 | 4/2004 | Greenblatt et al. |
| 2004/0138936 A1 | 7/2004 | Johnson et al. |
| 2004/0162741 A1 | 8/2004 | Flaxer et al. |
| 2005/0021548 A1* | 1/2005 | Bohannon et al. ............ 707/101 |
| 2005/0021745 A1 | 1/2005 | Bookman et al. |
| 2005/0044525 A1 | 2/2005 | Lazarov |
| 2005/0114757 A1 | 5/2005 | Sahota et al. |
| 2005/0235265 A1 | 10/2005 | Allen |
| 2006/0047638 A1* | 3/2006 | Dettinger et al. ............... 707/3 |
| 2006/0053172 A1 | 3/2006 | Gardner et al. |
| 2006/0112377 A1 | 5/2006 | Nacul et al. |
| 2006/0150160 A1 | 7/2006 | Taft et al. |
| 2006/0167946 A1 | 7/2006 | Hellman et al. |
| 2006/0195828 A1 | 8/2006 | Nishi et al. |
| 2006/0200251 A1 | 9/2006 | Gu et al. |
| 2006/0212855 A1 | 9/2006 | Bournas et al. |
| 2007/0023515 A1 | 2/2007 | Urken |
| 2007/0043803 A1 | 2/2007 | Whitehouse et al. |
| 2007/0078815 A1 | 4/2007 | Weng et al. |
| 2007/0156430 A1 | 7/2007 | Kaetker et al. |
| 2007/0162893 A1 | 7/2007 | Moosmann et al. |
| 2007/0168303 A1 | 7/2007 | Moosmann et al. |
| 2007/0174811 A1 | 7/2007 | Kaetker et al. |
| 2007/0179826 A1 | 8/2007 | Cutlip et al. |
| 2007/0186209 A1 | 8/2007 | Kaetker et al. |
| 2007/0198971 A1 | 8/2007 | Dasu et al. |
| 2007/0220046 A1 | 9/2007 | Moosmann et al. |
| 2007/0265862 A1 | 11/2007 | Freund et al. |
| 2007/0288250 A1 | 12/2007 | Lemcke et al. |
| 2008/0005278 A1 | 1/2008 | Betz et al. |
| 2008/0120129 A1 | 5/2008 | Seubert et al. |
| 2008/0127064 A1 | 5/2008 | Orofino et al. |
| 2008/0134138 A1 | 6/2008 | Chamieh et al. |
| 2008/0134152 A1 | 6/2008 | Edde et al. |
| 2008/0161941 A1 | 7/2008 | Strassner et al. |
| 2008/0243449 A1 | 10/2008 | Feblowitz et al. |
| 2008/0250390 A1 | 10/2008 | Feblowitz et al. |
| 2008/0288595 A1 | 11/2008 | Liu et al. |
| 2010/0191521 A1 | 7/2010 | Huet et al. |

OTHER PUBLICATIONS

Luiz S, Graph Representation of Assembly Plans, Apr. 1990.*
M. Sullivan. Tribeca: A stream database manager for network traffic analysis. In Proc. of the 22nd Intl. Conf. on Very Large Data Bases, Sep. 1996.
M. LeLarge, Z. Liu, and A. Riabov. Automatic composition of secure workflows. In ATC-06, 2006.
J. Ambite and C. Knoblock. Flexible and scalable query planning in distributed and heterogeneous environments. In AIPS'98, Jun. 1998.
H.Wang and C. Zaniolo: ATLaS: A Native Extension of SQL for Data Mining and Stream Computations, UCLA CS Dept., Technical Report, Aug. 2002.
M. A. Hammad, W. G. Aref, and A. K. Elmagarmid. Stream window join: Tracking moving objects in sensor-network databases. In Proc. of the 15th SSDBM Conference, Jul. 2003.
C. Cranor et al. Gigascope: A stream database for network applications. In SIGMOD, 2003.
S. Chandrasekaran et al. TelegraphCQ: Continuous Dataflow Processing for an Uncertain World. CIDR, 2003.
D. J. Abadi, et al: Aurora: a new model and architecture for data stream management. VLDB J. 12(2): 120-139 (2003).
Sheshagiri, M., desJardins, M., Finin, T.: A planner for composing services described in DAML-S. In: Web Services and Agent-based Engineering—AAMAS'03.
L'Ecu'e, F., L'Eger, A.: A formal model for semantic web service composition. In: ISWC. (2006).
Sirin, E., Parsia, B.: Planning for Semantic Web Services. In: Semantic Web Services Workshop at 3rd ISWC.
B. Parsia and E. Sirin. Pellet: An OWL DL reasoner. In the Semantic Web—ISWC 2004, 2004.
N. Jain et al. Design, implementation, and evaluation of the linear road benchmark on the stream processing core. In SIGMOD'06, Jun. 2006.
A. Riabov, Z. Liu, Planning for Stream Processing Systems, in Proceedings of AAAI-2005, Jul. 2005.
Y. Gil E. Deelman, J. Blythe, C. Kesselman, and H. Tangmunarunkit. Artificial intelligence and grids: Workflow planning and beyond. IEEE Intelligent Systems, Jan. 2004.
D. B. Terry et al. Continuous queries over append-only databases. In SIGMOD, pp. 321-330, 1992.
C-N Hsu and C .A. Knoblock. Semantic query optimization for query plans of heterogeneous multi-database systems, IEEE Transactions on Knowledge and Data Engineering, 12(6):959-978, Nov./Dec. 2000.
R. Ginis, R. Strom: An Autonomic Messaging Middleware with Stateful Stream Transformation, Proceedings of the International Conference on Autonomic Computing (ICAC'04).
A. Arasu, S. Babu, J, Widom. The CQL continuous query language: Semantic foundations and query execution. Technical Report 2003-67, Stanford University, 2003.
D.J. Abadi et al. The Design of the Borealis Stream Processing Engine (CIDR), Jan. 2005, Asilomar, CA.
Traverso, P., Pistore, M.: Automated composition of semantic web services into executable processes. In: ISWC. (2004).
Narayanan, S., McIiraith, S.: Simulation, verification and automated composition of web services. In: WWW. (2002).
Heflin, J., Munoz-Avila, H.: Low-based agent planning for the semantic web. In: Ontologies and the Semantic Web, 2002 AAAI Workshop.
Zhou, J., Ma, L., Liu, Q., Zhang, L., Yu, Y., Pan, Y.: Minerva: A scalable OWL ontology storage and inference system. In: 1st Asian Semantic Web Symp. (2004).
H. Knublauch, M. A. Musen, and A. L. Rector. Editing description logic ontologies with the protege owl plugin. Whistler, BC, Canada, 2004.
M. Stonebraker, U.çetintemel, S.B. Zdonik: The 8 requirements of real-time stream processing. SIGMOD Record 34(4): 42-47 (2005).
Grosof, B., Horrocks, I., Volz, R., Decker, S.: Description logic program: combining logic programs with descriptive logic. In: WWW03. 48-57.
European Office Action dated Aug. 18, 2010 in corresponding European Appln. No. 08 807 375.4-2212.
Nokia: "Nokia N95 User guide" Internet Citation, [Online] Aug. 2007, pp. 1-138, XP002498111 Retrieved from the Internet: URL:static.tigerdirect.com/pdf/NokiaN95usermanualUS.pdf [retrieved on Oct. 1, 2008].
"Adobe PDF Security—Understanding and Using Security Features with Adobe Reader and Adobe Acrobat" Internet Citation, [Online] XP003013727 Retrieved from the Internet: URL:adobe.com/products/pdfs/AdobePDFSecurityGuide-c.pdf [retrieve on Jan. 1, 2007].
J. Heflin (2004). Web Ontology Language (OWL) use cases and requirements. W3C Recommendation Feb. 10, 2004. Available at: w3.org/TR/webont-req/.
Bruijn "Semantic Web Technologies: Advanced SPARQL" May 4, 2006, pp. 115-140.
Klusch et al., "Semantic web service composition planning with owls-xplan," AAAI Fall Symposium on Semantic Web, 2005 aaai.org.
Sv Hashemian, A graph-based approach to web services composition, 2005, ieeexplore.ieee.org.
Natalya F. Noy et al, "Ontology Versioning in an Ontology Management Framework", 2004 IEEE Intelligent Systems, pp. 6-13.
Natalya F. Noy et al, "The PROMPT suite: interactive tools for ontology merging and mapping", Int. J. Human-Computer Studies 59 (2003), pp. 983-1024.
Mario Cannataro et al, "The OnBrowser Ontology Manager: Managing Ontologies on the Grid", International Workshop on Semantic Intelligent Middleware for the web and the Grid, 2004, 15 pages.
Henrique C.M. Andrade et al, "Query Optimization in Kess—An Ontology-Based KBMS", SBBD CEFET (2000), pp. (35-48), 15 pages.
Alexander Maedche et al, "Ontologies for Enterprise Knowledge Management", 2003 IEEE Intelligent Systems, pp. 26-33.
Cheonshu Park et al., "A Study on the Web Ontology Processing System", 2005 Advanced Communicaton Technology, vol. 2, pp. 1035-1038.

* cited by examiner

200

800

METHOD FOR DECLARATIVE SEMANTIC EXPRESSION OF USER INTENT TO ENABLE GOAL-DRIVEN INFORMATION PROCESSING

GOVERNMENT INTERESTS

This invention was made with Government support under Contract No.: H98230-05-3-0001 awarded by the U.S. Department of Defense. The Government has certain rights in this invention.

RELATED APPLICATIONS

This application is related to: commonly assigned U.S. application entitled "METHOD AND SYSTEM FOR ASSEMBLING INFORMATION PROCESSING APPLICATIONS BASED ON DECLARATIVE SEMANTIC SPECIFICATIONS", Ser. No. 11/695,238, filed concurrently herewith and incorporated by reference herein in its entirety; commonly assigned U.S. application entitled "METHOD AND SYSTEM FOR AUTOMATICALLY ASSEMBLING STREAM PROCESSING GRAPHS IN STREAM PROCESSING SYSTEMS", Ser. No. 11/695,487, filed concurrently herewith and incorporated by reference herein in its entirety; commonly assigned U.S. application entitled "METHOD FOR SEMANTIC MODELING OF STREAM PROCESSING COMPONENTS TO ENABLE AUTOMATIC APPLICATION COMPOSITION", Ser. No. 11/695,457, filed concurrently herewith and incorporated by reference herein in its entirety; commonly assigned U.S. application entitled "METHOD FOR DECLARATIVE SEMANTIC EXPRESSION OF USER INTENT TO ENABLE GOAL-DRIVEN STREAM PROCESSING", Ser. No. 11/695,430, filed concurrently herewith and incorporated by reference herein in its entirety, commonly assigned U.S. application entitled "METHOD AND SYSTEM FOR AUTOMATICALLY ASSEMBLING PROCESSING GRAPHS IN INFORMATION PROCESSING SYSTEMS", Ser. No. 11/695,349, filed concurrently herewith and incorporated by reference herein in its entirety; commonly assigned U.S. application entitled "METHOD FOR MODELING COMPONENTS OF AN INFORMATION PROCESSING APPLICATION USING SEMANTIC GRAPH TRANSFORMATIONS"Ser. No. 11/695,311, filed concurrently herewith and incorporated by reference herein in its entirety; and commonly assigned U.S. application entitled "METHOD AND SYSTEM FOR COMPOSING STREAM PROCESSING APPLICATIONS ACCORDING TO A SEMANTIC DESCRIPTION OF A PROCESSING GOAL-"Ser. No. 11/695,410, filed concurrently herewith and incorporated by reference herein in its entirety.

BACKGROUND OF THE INVENTION

1. Technical Field

The present invention relates to constructing declarative descriptions of information processing requests, and more particularly, to a method for declarative semantic expression of user intent to enable goal-driven information processing.

2. Discussion of the Related Art

Generally, software applications achieve a desired processing outcome at the request of a person or agent by using a collection of reusable software components assembled to achieve the outcome. When a request must be accommodated and no suitable application exists, the requester can cobble together a solution by collecting partial solutions from existing applications, doing some additional manual work to complete the task. However, new or adapted applications are generally needed; thus, requiring the initiation of a human process to accumulate application requirements and to develop/adapt/assemble applications that can achieve the desired outcome. A challenge arises in understanding the processing request, understanding the components that might achieve the desired outcome, and knowing how to build and/or assemble the components to achieve the processing outcome and fulfill the request.

Expressing desired processing outcomes directly as computer programs coded using general-purpose languages such as C++ or Java generally requires long development cycles and imposes high maintenance costs for any new type or variant of information processing outcome. Casting such requests as traditional queries can reduce some of the costs and delays by providing a simpler means of expressing and applying complex data transformations, etc. However, these query-oriented approaches do not offer sufficient coverage for a wide variety of requests involving non-query goals or requests for outcomes involving operations on unstructured data (e.g., speech-to-text and image recognition operations), nor are they resilient in the face of modifications to underlying conceptual schemas.

Both of the programming approaches and the query approaches suffer from an absence of an explicitly declared intent. In other words, they do not explicitly denote the intent of the outcome requested, with instead the intent being implicit and often only present in the minds of software developers. Thus, any adjustments to either the requested outcome or the underlying conceptual schemas can become challenging and costly, often requiring developers to "reverse engineer" existing applications in an attempt to harvest the original intent in order to adapt to the modifications.

Further, in such approaches, the requester of the processing outcome must generally know some potentially large amount of detail as to the means of fulfilling the request. For example, programmers need to know specific steps to be taken and query writers need to know the structure of tables and the details of the operation composition to produce just one approach, representing only one approach to fulfilling the request. If there are many possible means of satisfying a request, the users must also know which way is best, under what circumstances, and the circumstances under which their solutions are to be used.

SUMMARY OF THE INVENTION

In an exemplary embodiment of the present invention, a method for constructing a processing request so that an information processing application satisfying the processing request can be assembled, comprises: inputting a processing request, wherein the processing request includes a goal that is represented by a graph pattern that semantically describes a desired processing outcome; and assembling a processing graph that includes at least one component that satisfies the desired processing outcome, wherein the processing graph is assembled by associating the graph pattern that semantically describes the desired processing outcome with a graph pattern that semantically describes an applicability condition of the at least one component or a graph pattern that semantically describes an inclusion effect of the at least one component.

The processing request is encoded in a request specification language.

The goal is a goal that requests production of data, a goal that requests an update of retained state information, a goal that requests installation of a component or a goal that requests removal of a component.

The method farther comprises: deploying an information processing application embodying the at least one component of the processing graph; and operating the information processing application.

Result data is produced when operating the information processing application. The result data is an end result of the operated information processing application or an intermediate result of the operated information processing application, wherein the intermediate result is an inclusion effect of the at least one component of the processing graph.

When the goal is a goal that requests the production of data, the result data includes an element that is a requested data item. The element is expressed as a variable. The element is defined in a where clause. The where clause explicitly references the variable. The where clause includes an assertion that constrains a type of data item acceptable as an element. The assertion refers to a class description in an ontology.

When the goal is a goal that requests the production of data, the processing request further includes a disposition that semantically describes a means of handling the result data. The disposition includes a condition expression that defines a condition under which the disposition is to occur. The condition expression is a Boolean expression. The disposition indicates that the result data is to be conveyed to a network destination, the result data is to be retained for further processing, the result data is available for retrieval or the result data is to be conveyed to an external data store.

The processing request further includes a constraint that is represented by a graph pattern that semantically describes constraints on the assembly of the processing graph. The constraint establishes a preference on the inclusion of an algorithm or a component that is to be included in the processing graph or the interconnection of components in the processing graph. The constraint is a hard constraint or a soft constraint.

The processing request further includes an outcome response that is represented by a graph pattern that semantically describes an action to be taken upon achievement of the desired processing outcome. The outcome response includes a condition under which the action is to be taken.

When the goal is a goal that requests the production of data, the graph pattern that semantically describes an action to be taken upon achievement of the desired processing outcome further describes a means of handling result data that is produced when operating an information processing application embodying the at least one component after the information processing application has been deployed.

The applicability condition of the component is a semantic description of criteria that must be satisfied in order to include the component into the processing graph.

The inclusion effect of the component is a semantic description of an effect of including the component in the processing graph.

In an exemplary embodiment of the present invention, a system for constructing a processing request so that an information processing application satisfying the processing request can be assembled, comprises: a memory device for storing a program; a processor in communication with the memory device, the processor operative with the program to: receive and compile a processing request, wherein the processing request includes a goal that: is represented by a graph pattern that semantically describes a desired processing outcome; and assemble a processing graph that includes at least one component that satisfies the desired processing outcome, wherein the processing graph is assembled by associating the graph pattern that semantically describes the desired processing outcome with a graph pattern that semantically describes an applicability condition of the at least one component or a graph pattern that semantically describes an inclusion effect of the at least one component.

In an exemplary embodiment of the present invention, a computer program product comprising a computer useable medium having computer program logic recorded thereon for constructing a processing request so that an information processing application satisfying the processing request can be assembled, the computer program logic comprises: program code for receiving and compiling a processing request, wherein the processing request includes a goal that is represented by a graph pattern that semantically describes a desired processing outcome; and program code for assembling a processing graph that includes at least one component that satisfies the desired processing outcome, wherein the processing graph is assembled by associating the graph pattern that semantically describes the desired processing outcome with a graph pattern that semantically describes an applicability condition of the at least one component or a graph pattern that semantically describes an inclusion effect of the at least one component.

The foregoing features are of representative embodiments and are presented to assist in understanding the invention. It should be understood that they are not intended to be considered limitations on the invention as defined by the claims, or limitations on equivalents to the claims. Therefore, this summary of features should not be considered dispositive in determining equivalents. Additional features of the invention will become apparent in the following description, from the drawings and from the claims.

DETAILED DESCRIPTION OF EXEMPLARY EMBODIMENTS

Figure 1:
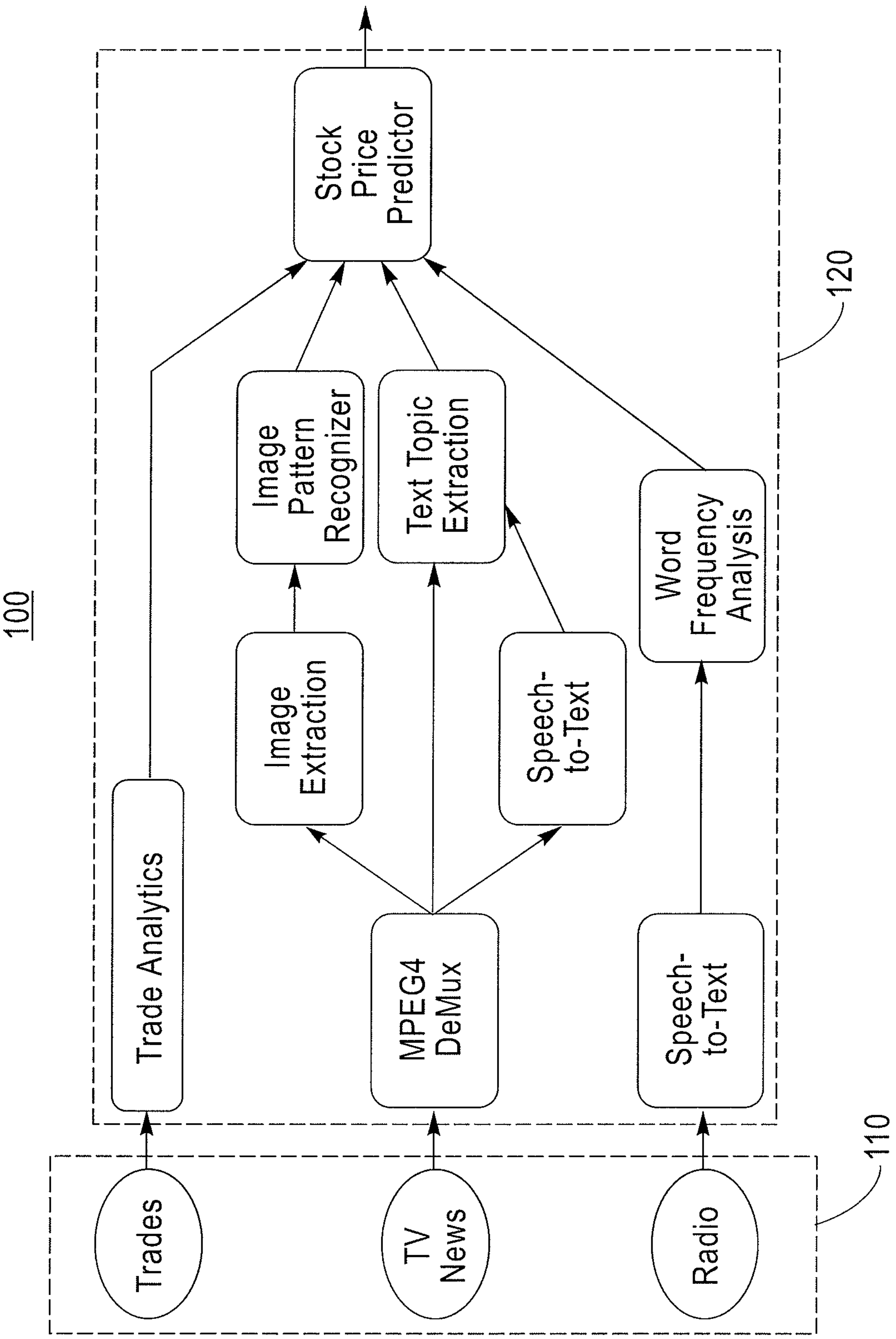
FIG. 1 illustrates a processing graph according to an exemplary embodiment of the present invention.

In accordance with an exemplary embodiment of the present invention, a method for conveying to an information system a user's desired outcome of one or more processing requests using semantic descriptions of processing goals plus semantically described constraints on potential solutions is provided. The corresponding semantic descriptions, when specified according to the method and interpreted in the presence of semantically described processing components, are used by a planner/compiler to automatically assemble a processing graph to fulfill the request.

In this embodiment, semantic graph patterns are used to convey the desired processing outcomes such as goals, and constraints on the means by which the outcomes are pursued. In this manner, the goals and constraints prepared by the user do not convey the mechanism by which the request is to be satisfied, nor do they convey the operators to be applied to produce a result. This allows the compilation mechanism the freedom and flexibility to select from many alternative data sources and processing methods best suited to the computational resources at the time of the request. In this way, information processing components not envisioned by the user can be applied, thus potentially providing a higher quality outcome such as an outcome that consumes fewer computational resources or that satisfies any of a number of desired processing characteristics, than can be selected by the user.

It is to be understood that since a predominant type of processing request for software systems is the production of information, the following description of exemplary embodiments of the present invention will focus on how the method is used to describe information production requests and on how the method is used to automatically assemble processing graphs producing the requested information. However, since other types of outcomes, for example, the modification of stored data or the initiation of a process, are also in the realm of desired processing outcomes, several other types of information processing goals are envisioned for use with the present invention. Further, since the set of all processing outcomes is never completely known, the method provides a means of extending the set of defined outcomes as well as a means of extending the set of constraints that may be imposed on the solutions.

In accordance with another exemplary embodiment of the present invention, a method for semantically describing software components, which can be dynamically added to a system embodying the present invention is provided. In accordance with yet another exemplary embodiment of the present invention, a method and system for processing all of these descriptions by using a planner/compiler is provided. Here, the planner/compiler interprets the desired outcomes, the descriptions of candidate data sources and processing methods, and produces one or more information processing applications believed to be responsive to the semantically expressed intent.

Since a processing graph will be referred to when describing exemplary embodiments of the present invention, a brief description of a processing graph will now be provided.

Processing Graph

A processing request is a semantically expressed request for processing to be performed by a suitable processing application. Typically, such requests are for the production of information, but other types of outcomes are possible.

Applications that process these requests are viewed as compositions of reusable software components. The compositions are referred to as processing graphs, with the nodes being the various software components, interconnected by arcs connecting inclusion effects, which are typically output data productions, to applicability conditions, which are typically input data requirements.

For a given processing request, a collection of data sources 110 and components 120 can be configured into a processing graph 100 that can achieve the request's goal (see FIG. 1).

A single processing graph might draw from one or more data sources, and may perform any type of processing. For example, a dataflow processing graph may filter, transform, aggregate, correlate, etc., data to provide the desired result data. Consider, a stock prediction model (isolating the top thread in FIG. 1) that draws upon a single Trades data input and applies a Trade Analytics component and a Stock Price Predictor component to produce a single Stock Price Prediction. In order to improve the accuracy of the prediction, the application may analyze data from Trades, TV News and Radio sources, as shown in FIG. 1, with the Stock Price Predictor component basing a prediction on feeds from each of the analytic chains, each conveying some information about the company in question.

A description of the exemplary embodiments of the present invention will now be provided in the following order: Specification of Processing Requests; Modeling Components using Semantic Graph Transformations; and Method and System for Automatic Composition of Information Processing Applications.

Specification of Processing Requests

Users convey to a system embodying the present invention their desired processing outcomes via processing requests. Processing requests are expressed via request specifications encoded in a request specification language. The request specification language is a machine-interpretable encoding of the request. The specific encoding format is not important, so long as the requisite elements are described and conveyed, with enough formal, machine-interpretable descriptive content, so that they can be interpreted by a request compiler/planner. When feasible, the compiler automatically assembles an application believed capable of achieving the processing outcome conveyed in the request specification.

A request specification is a declarative semantic expression of the desired effects of running a software application and the constraints under which the application is assembled. Request specifications carry the least amount of description needed to convey intent, without unnecessary detail of how the request is to be carried out. A request specification can be automatically transformed by a request compiler into an application that is represented as a processing graph.

Request specifications are built from semantic graph expressions, which are to be evaluated according to a semantic model of the concepts from a domain or domains of interest. Request specifications use terms that are formally defined in domain ontologies captured, for example, in a language such as Web Ontology Language-Description Logic (OWL-DL), W3C Rec. 10 Feb. 2004, a copy of which is incorporated by reference herein in its entirety. These domain ontologies contain formal models of the user's problem domain. In addition, there are system ontologies that contain formal functional descriptions of processing components. With terms defined in a formal logic, automated reasoners can be employed to match the request goals to component capabilities by using inference where necessary to apply domain-independent components to the task of producing domain-specific results.

Request specifications are authored by a user or some user agent and convey, at the very least, an expression of the user's goal for the request, for example, the goal of producing a notification that a particular company's stock value is anticipated to change by an amount greater than 5% of its current value, or non-information-production goals such as the goal of having a piece of software installed or having a particular device configured. The request specification may also contain constraints on how that goal is to be achieved, for example, to avoid the use of video surveillance cameras as data sources or to favor the use of K-means clustering algorithms.

The goals, along with the accompanying constraints, are described and conveyed in such a way that they can be processed by a request compiler. The compiler is a specialized artificial intelligence (AI) planner that treats these constrained goal specifications as end effects, deriving them from the information needed to assemble suitable processing graphs.

Consider a simple request to watch for factors that might anticipate a significant change in a company's stock price. The request might be expressed informally as "watch for changes greater than 5 percent in the stock price of company Breakfast Foods Group (ticker symbol BFG)."

BFG stock price prediction might be expressed as:

```
Request BFGStockActivityPrediction
  Produce
    Result
      With Elements
        ?PredictedStockPrice,
        ?PredictedPercentageChange
    Where
?Company        a BreakfastFoodsCompany ;
                hasTicker BFG ;
                hasStockPricePrediction ?Prediction .
?Prediction     a :StockPricePrediction ;
                hasPredictedStockPrice ?PredictedStockPrice ;
                hasPercentChange ?PredictedPercentageChange .
?PredictedStockPrice
                a :MonetaryAmount .
?PredictedPercentageChange
    a :PercentChange .
```

The request "BFG Stock Activity Prediction" has one goal, that is, to produce one result with two result elements, the variables ?PredictedStockPrice and ?PredictedPercentageChange.

Figure 2:
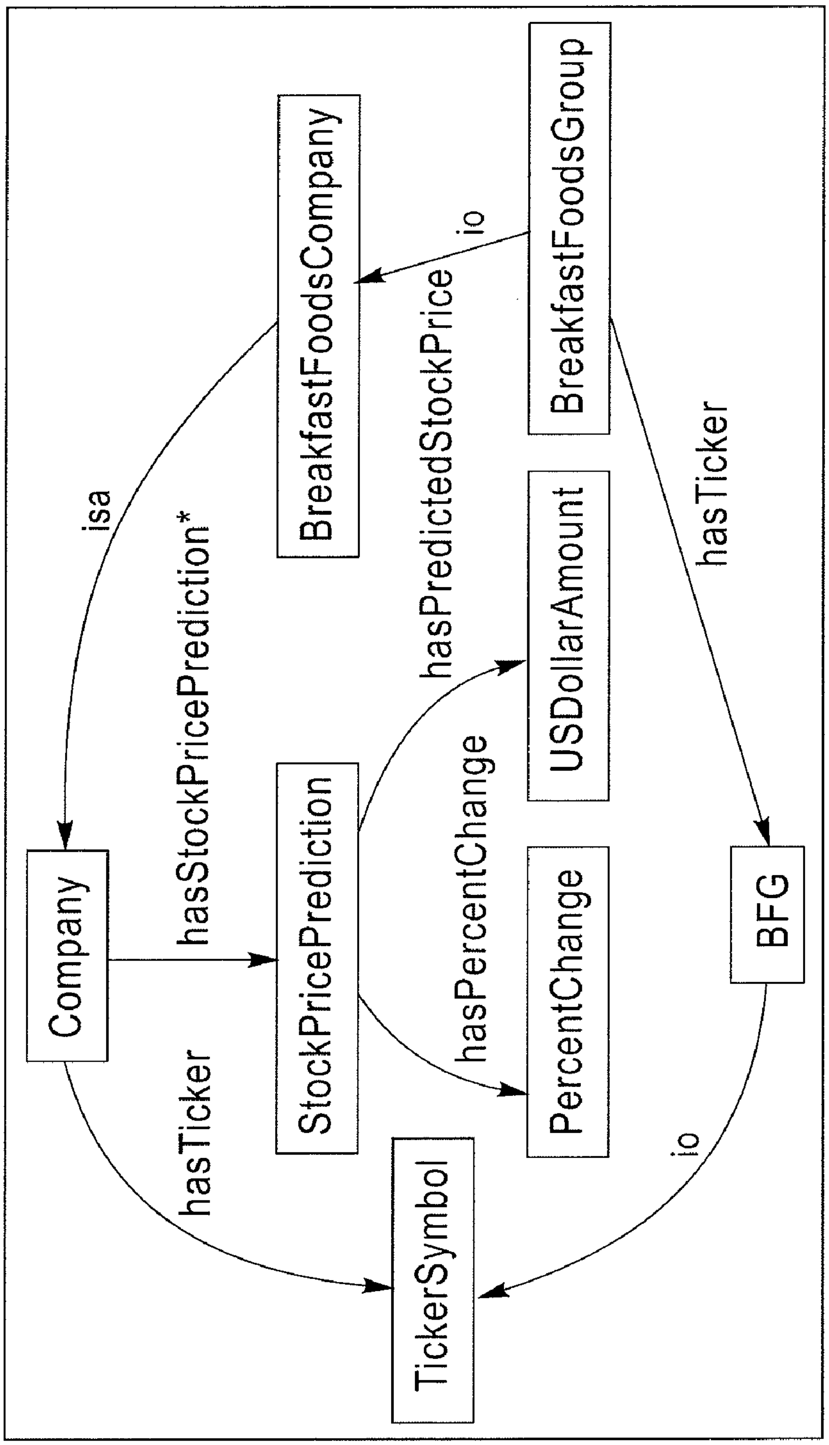
FIG. 2 illustrates a domain ontology fragment according to an exemplary embodiment of the present invention.

The request is written with a domain ontology in mind (as shown, e.g., by a domain ontology fragment 200 in FIG. 2), and states, that for a Breakfast Foods Company with Ticker symbol BFG, the elements ?PredictedStockPrice and ?PredictedPercentageChange are part of a ?Prediction associated with the company.

Produce goals optionally describe result disposition specifications, which are descriptions of what to do with the resulting data. Some result data is surfaced for further processing, some retained for later reference, some for export to external stores (database (DB), knowledgebase (KB), . . . ), and some for external reference, for example, via notification.

Results can be dealt with in a number of ways according to a set of disposition instructions (e.g., to notify some interested person or their agent of the result, to persist the result for some specified amount of time, or to send the result to some IP port on some remote host, etc.). Multiple dispositions can be expressed for each declared result, and any disposition can be conditionally applied.

Here, the result is persisted for one month (six months if the PredictedPercentageChange >=5 percentage points), and the inquirer will be notified via a default mechanism of any PredictedPercentageChange >=5 percentage points.

```
Request BFGStockActivityPrediction
  Produce
    Result
      With Elements
```

-continued

```
        ?PredictedStockPrice,
        ?PredictedPercentageChange
      With Dispositions
        persist for 1 month,
        notify if ?PredictedPercentageChange >= 5,
        persist for 6 months
    if ?PredictedPercentageChange >= 5
```

Note that the request shown above neither specifies nor constrains the components to be used in the processing graph. This approach favors discovery of components, for example, individual algorithms or processing subgraphs, in an attempt to avoid over-constrained specifications. User designation of components is optional; the absence of such designations enables the request compiler to identify sources and methods that users may not have been aware of, or that may produce higher quality results than those produced by user-specified sources and methods.

However, a request specification can include constraints regarding various plan elements. Constraints convey a requestor's instructions to Prefer, Avoid, etc., specified plan elements such as Data Sources, Methods, etc. These expressions provide indirect guidance to the compiler (as soft constraints) on the assembly of processing graphs. Say, for example, a custom developed algorithm for interpreting stock ticker data is strongly preferred, or the use of any surveillance video is to be avoided:

```
Request BFGStockActivityPrediction
  Produce
    . . .
  Prefer
    Method ?M
      Where
        ?M implementsAlgorithm ProprietaryTradesAnalysisAlgorithm .
    DataSource ?STDFeed
      Where
        ?STD produces StockTickerData .
  Avoid
    DataSource ?SVFeed
      Where
?SVFeed produces SurveillanceVideo .
```

Constraints can be either hard (e.g., absolute), or soft (e.g., preferences). Hard constraints specifically require or prohibit some element or property of the solution. Soft constraints provide less strict guidance as to the composition of the processing graph. The use of preferences rather than absolute designations allows for the discovery of better alternative solutions in the context of user preferences and is thus favored for this method. Using only soft constraints, the request specification can guide choices a compiler might make, requiring user knowledge only of the items to be constrained but not of how the processing graph is assembled. But, because hard constraints are sometimes required, the method also provides a means of expressing such constraints.

The ontology in this example defines a property of Company called hasStockPricePrediction with a range StockPricePrediction. This value of this property is not likely to be available from a data source. More likely, a combination of components capable of producing such a result would be needed to establish that relation and populate the remainder of the price prediction submodel, for example, the hasPredictedStockPrice and the hasPercentChange properties.

While subtle, this is a key element for operator extensibility. For example, rather than enriching a language with function calls accessing user-provided code modules, request specifications declaratively express the goal or goals of analysis via concepts and relations in the ontologies. So, rather than calling a function to perform a task, request specifications describe a result that can be achieved by assembling a processing graph that can produce the result. Thus, a goal-specified, declarative description is used, rather than a function invoked in a query expression. Further, instead of requiring the requester to describe the operations needed to calculate a ?PredictedPercentChange, some processing graph is automatically assembled to produce the result, composed from the needed operators, for example, the data sources and software components that jointly surface the requested data.

Request specifications can be expressed and conveyed in a textual form, as depicted in the BFG example above. Since request specifications are expected to be produced and consumed mostly by tools, the predominant representation is expected to be an XML encoding, conformant to an XML Schema, W3C Rec. 28 Oct. 2004, a copy of which is incorporated by reference herein in its entirety.

The processing request can further include an outcome response represented by a graph that semantically describes additional goals that are to be achieved upon the fulfillment of the processing request goal. In other words, the outcome response extends the processing request to include such other goals, which are to be pursued upon the achievement of the processing request goal. When the outcome response is included in the processing request, a generated processing graph must be assembled in a way such that, upon operation, the graph fulfills the goal of the processing request and also performs any additional specified outcome response goals.

Modeling Components Using Semantic Graph Transformations

For processing graph assembly to be automatable, machine-interpretable semantic descriptions of components' functional characteristics are needed. Here, the focus is on black-box descriptions of each component, providing semantic descriptions of the applicability conditions and inclusion effects of each component and the inclusion effects of each data source. Any machine-interpretable description of a component's functional capabilities can be considered, so long as there is a means by which those descriptions can be used by a planner/compiler to create a suitable processing graph.

Applicability conditions and inclusion effects are modeled using semantic graph patterns. These graphs describe the criteria that determine the assembly of the processing graphs from among the complete set of graph elements (i.e., the data sources and software components). For a graph element to be included in a processing graph, its applicability condition must be met; these conditions are met by the inclusion effects of other elements. The graphs associated with a given component's applicability conditions describe constraints that must be satisfied in order for the components to work correctly. Hence, the descriptions are used to determine which other components, via their inclusion effects, can satisfy the inclusion criteria, forming the basis for automated assembly of processing graphs.

For an embodiment in which a request for the production of data is provided, the applicability conditions describe the availability of data for input to the component, and the inclusion effects are the production by the component of output data. More simply, the applicability conditions describe the component's inputs and the inclusion effects describe the component's outputs. The graphs associated with a given component's inputs describe constraints that any input data must satisfy in order for the component to work correctly. Hence, the descriptions are used to determine which other components can provide input data to the component, forming the basis for automated assembly of processing graphs.

These descriptions are represented using a semantic description technique, for example, OWL-DL. Reasoning at an expressivity similar to DL reasoning is essential in the graph assembly process, if any but the most trivial matching is to be pursued.

Representation of Semantic Descriptions

Semantic descriptions consist of processing component descriptions and descriptions of the conditions for applying the component and the effects of including the component in the graph. For data production graphs, the semantic descriptions consist of processing component descriptions of the data produced/required by the components. Processing component descriptions are based on core concepts defined in the system ontologies, and the data descriptions are based on sets of domain and shared ontologies. The system ontologies define concepts such as DataSource, and SoftwareComponent, and the relations, produces, requires, and contains. Expressed below in RDF N3 format is an excerpt of an exemplary OWL representation:

| | | |
|---|---|---|
| :DataSource | a | owl:Class ; |
| | :produces | :Output . |
| :SoftwareComponent | a | owl:Class ; |
| | :requires | :Input ; |
| | :produces | :Output . |
| :Output | :contains | owl:Thing . |

From these basic building blocks, specific Data Source, Software Component, Input and Output prototypes can be defined, each describing specific Data Source, Input, Output, and Software Component exemplars such as DataSource : HubbleEarthImageSource_1 and SoftwareComponent :ImagePatternRecognizer_1, and their respective inputs and outputs.

The contains relation for input and outputs, provides the mechanism for associating to a component semantic description of data to be carried on its inputs and/or outputs.

Figure 3:
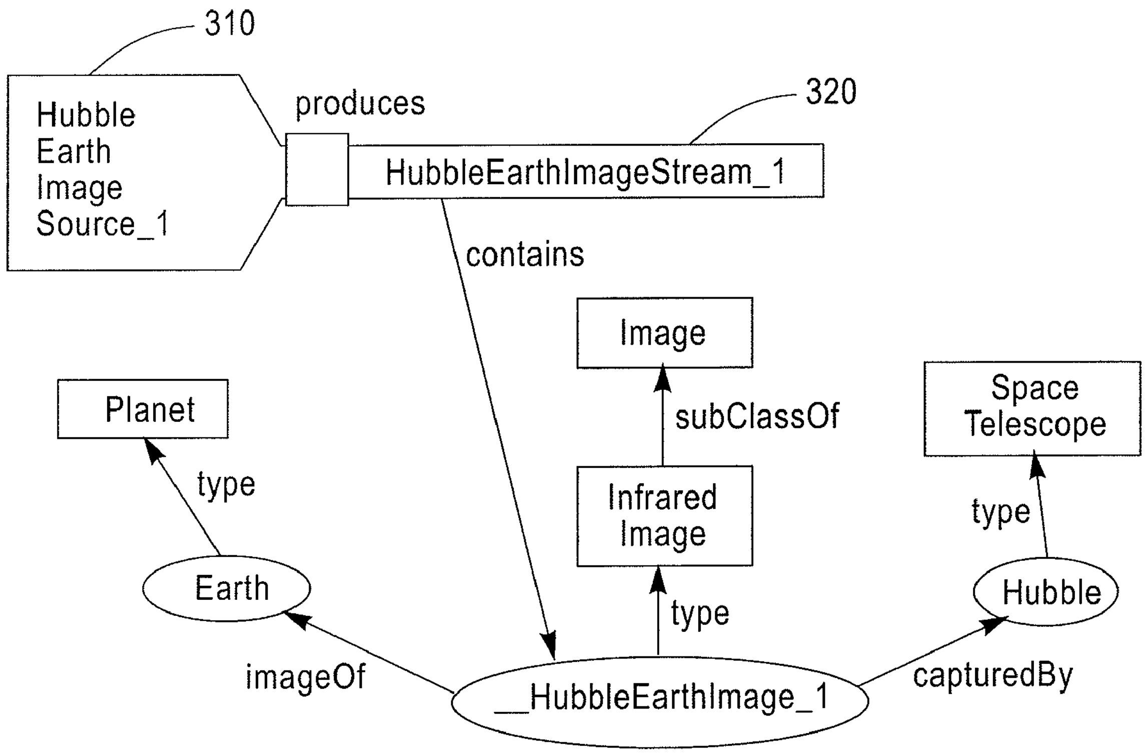
FIG. 3 illustrates a data source semantic description according to an exemplary embodiment of the present invention.

In FIG. 3, HubbleEarthImageSource_1, a DataSource 310, produces an Output 320 that contains HubbleEarthImage_1, an individual in the class InfraredImage:

| | | |
|---|---|---|
| :HubbleEarthImageSource_1 | a | :DataSource ; |
| | :produces | :HubbleEarthImageOutput_1 . |
| :HubbleEarthImageOutput_1 | :contains | :HubbleEarthImage_1 . |
| :HubbleEarthImage_1 | a | :InfraredImage ; |
| | :imageOf | :Earth ; |
| | :capturedBy | :Hubble ; |
| | a | :Variable ; |
| | a | :Exemplar. |

The use of the double underscores ("_") in _HubbleEarthImage_1 is a graphical shorthand indicating that Image_1 is also a Variable and an Exemplar, represented above as being of type Variable and of type Exemplar (both of which are special classes defined in the system ontology). The _HubbleEarthImage_1 is an Exemplar that can take the value of an individual in the class InfraredImage and that has the appropriate capturedBy and imageOf properties associated therewith. Note that Hubble and Earth do not really appear in the output; instead, they are semantic descriptions of the _HubbleEarthImage_1 data, which appears in the output. Hence, the contains relation is a special relation (i.e., only those data items that the output explicitly describes using the contains relation are actually contained in the output). The remainder of the objects (e.g., Earth), while not contained in the output, form a rich semantic description of the objects contained in the output (_HubbleEarthImage_1).

Figure 4:
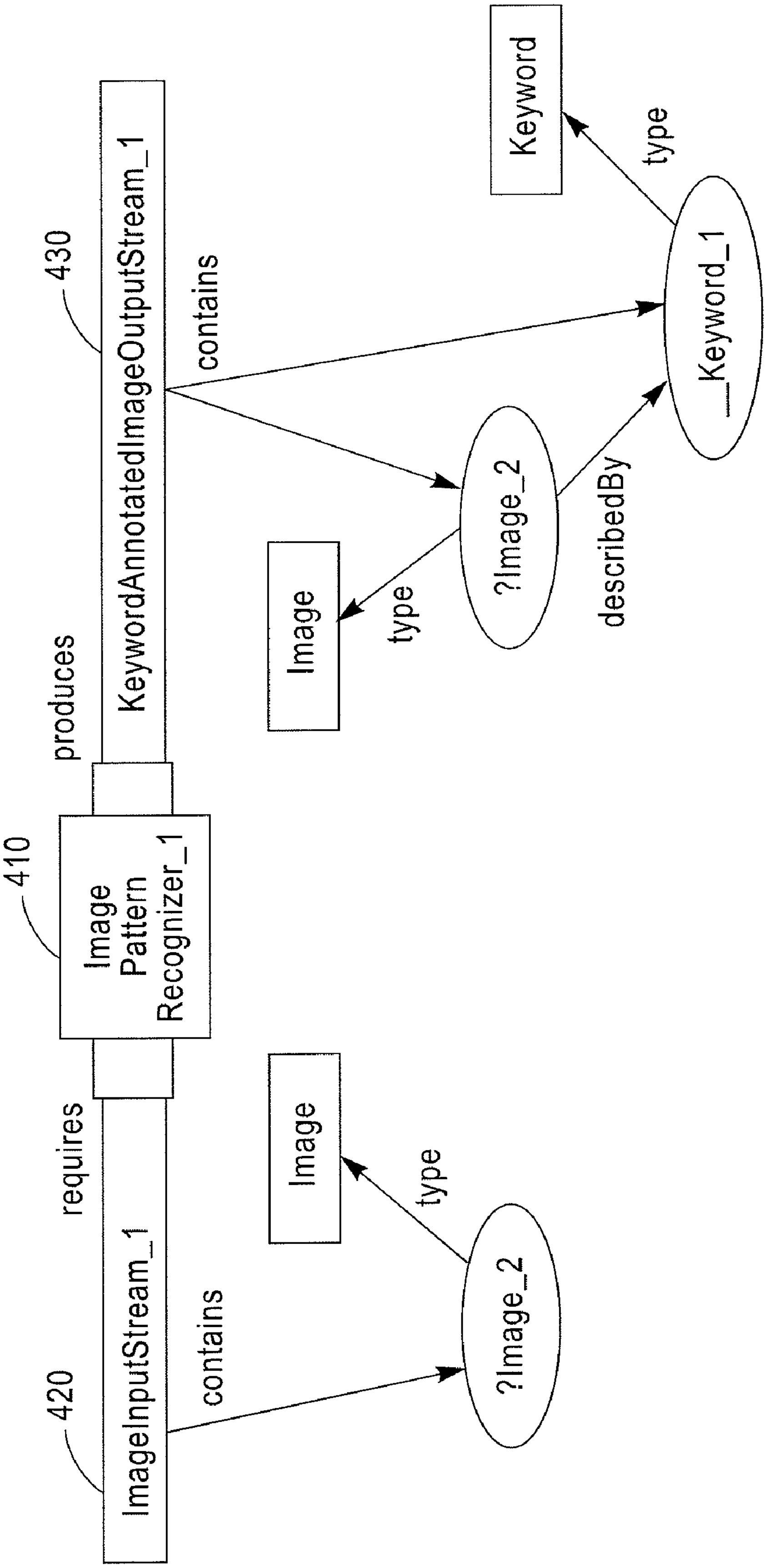
FIG. 4 illustrates a component semantic description according to an exemplary embodiment of the present invention.

Software components are described as requiring some number of inputs and producing some number of outputs. An ImagePatternRecognizer_1 processing component (ImagePatternRecognizer 410 in FIG. 4), is defined as requiring one input 420 containing ?Image_2, an Image, and as producing a single output 430 containing ?Image_2, and a Keyword _ Keyword_1, such that ?Image_2 is described By Keyword_1. Here the "?" preceding Image_2 is a graphical notation that Image_2 is a Varnable (not an Exemplar). This means that the ImagePatterRecognizer_1 requires an input ?Image_2 and produces the same ?Image_2 as an output annotated by a new thing, _Keyword_1.

The ImagePatternRecognizer_1 is defined to perform a few functions: it conveys a known Image from input to output, it creates a new object (Exemplar) (e.g., a Keyword), and it establishes a new relation, describedBy.

Method and System for Automatic Composition of Information Processing Applications In order to connect two components together, it is first determined if the output of a first component can be connected to the input of a second component, and once the components are connected to each other, the resulting output produced by the second software component is then determined.

Given the descriptions of inputs and outputs of components, a process for determining if an output of a first component can be matched to an input of a second component will now be described. The component matching problem is treated as a graph embedding problem in which the question, "Can the graph describing the input be embedded in a graph describing another component's output?" is answered. This approach is different from traditional approaches where matching is generally based on simple type-checking alone. The graph embedding approach is more powerful, building on the expressivity of semantic graphs.

To formally describe the component matching problem, let $G_I=(V_I, C_I, E_I)$ represent the input graph where $V_I$ is the set of variable modules, $C_I$ is the set of non-variable of constant nodes, and $E_I$ is the set of edges of the form {u, p, v} where node u is related to node v through property p. Similarly, let $G_O=(V_O, C_O, E_O)$ represent the output graph. Note that $G_I$ and $G_O$ are directed graphs.

$G_I$ can be embedded in $G_O$, if there exists a graph homomorphism f: $G_I \rightarrow G_O$, that is, there is a mapping $f: V_I \cup C_I \rightarrow V_O \cup C_O$ such that if $\{u, p, v\} \in E_I$ then $\{f(u), f(p), f(v)\} \in E_O$. In addition, for any $x \in C_I$, f(x)=x. This means that constant nodes can only be mapped to equivalent constant nodes in the other graph, while variable nodes can be mapped to other variable nodes or constant nodes.

In addition, DL reasoning is applied to the output graphs to enable more flexible matching. In other words, graph $G_O$ is expanded with the results of DL reasoning to create graph $G_O'$. Graph $G_1$ is then checked to see if it can be embedded in $G_O'$. The use of reasoning provides a matching process that is capable of connecting components, even if the inputs and outputs are described using different terms. DL reasoning allows inferring new facts based on definitions in the ontology such as subclass and subproperty relationships, transitive, symmetric, inverse and functional properties, property restrictions, equality and inequality statements, etc.

Figure 5:
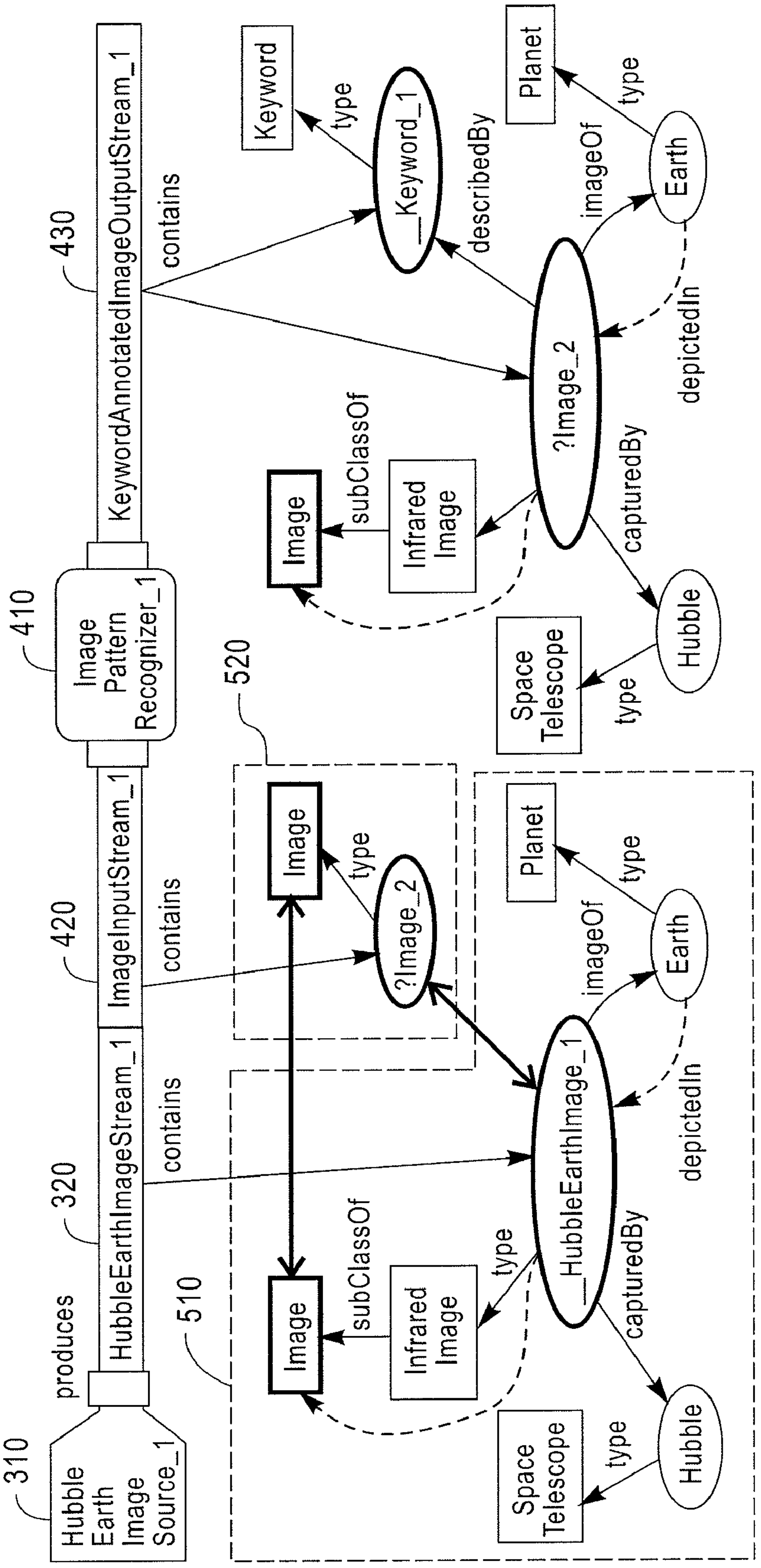
FIG. 5 illustrates a data source connected to a component according to an exemplary embodiment of the present invention.

For example, in FIG. 5, an output graph 510 from HubbleEarthImageSource_1 is first expanded to include the results of DL reasoning. As a result, a type link is added from HubbleEarthImage_1 to Image (this is obtained from the subclass relationship between InfraredImage and Image). In addition, a depictedIn link is added from Earth to _HubbleEarthImage_1 (depictedIn defined as an inverse property of imageOf). Next, the matching process finds a homomorphism from an input graph 520 of the ImagePatternRecognizer to the output graph 510 of HubbleEarthImageSource_1. In this homomorphism, ?Image_2 is mapped to _HubbleEarthImage_1 (since they are both variables) and Image is mapped to Image (since they are both the same concept). Hence, the matching process determines that there is a match.

Determining the Output of a Software Component

To help determine the output of a software component as a result of drawing data from the outputs of other components, a formal functional model of the software component is defined. In the model, the software component can be viewed as performing a graph transformation on the semantic graphs on the inputs to produce semantic graphs on the outputs.

$$\overline{L} = \bigcup_{i=1}^{m} L_i \text{ and } \overline{R} = \bigcup_{j=1}^{n} R_j.$$

The software component implements a graph transformation described in the OWL ontology: pe: $\overline{L} \rightarrow \overline{R}$.

Note that there may be an overlap between $\overline{L}$ and $\overline{R}$. Now assume that the m input graphs have been matched to m outputs generated by other components, that is, $L_i$ is matched to $X_i$ for i=1 . . . m. The outputs $Y_j$ coming from this software component are determined as a result of connecting the inputs $X_i$ to the software component using a graph homomorphism, f: $\overline{L} \cup \overline{R} \rightarrow \overline{X} \cup \overline{Y}$ where $$\overline{X} = \bigcup_{i=1}^{m} X_i \;\&\; \overline{Y} = \bigcup_{j=1}^{n} Y_j.$$

In the model of the software components, f satisfies the following properties (for i=1 . . . m and j=1 . . . n):

1. $f(L_i) \subset X_i$. This is acquired from the previous step that matched the components.

2. $f(R_j) \subset Y_j$.

3. $f(\overline{L} \backslash \overline{R}) = f(\overline{X} \backslash \overline{Y})$ and $f(\overline{R} \backslash \overline{L}) = f(\overline{Y} \backslash \overline{X})$, where "\" represents the graph difference operation. This means that exactly that part of $\overline{X}$ is deleted which is matched by elements of $\overline{L}$ not in $\overline{R}$, and exactly that part of $\overline{Y}$ is created that is matched by elements new in $\overline{R}$.

Using properties 2 and 3, the outputs, $Y_j$, of a software component can be determined as a result of connecting $X_i$ to the component. An example of this process is shown in FIG. 5, where the output 430 of the ImagePatternRecognizer_1 is generated based on the input 320 that is connected to the ImagePatternRecognizer_1.

Composition Process

A semantic planner for automatically generating processing graphs from processing requests and semantic descriptions of components will now be discussed. The semantic planner enhances traditional AI planning techniques to plan on domains expressed in onotologies. Processing requests, in this case, user queries, are expressed as semantic graph patterns. The planner recursively connects components to each other using the methods described above until it arrives at an outcome description that can be matched to the request specification, or until no new output descriptions can be produced.

In addition, the planner satisfies various constraints such as privacy and security, and produces optimal plans for a given resource consumption range.

Figure 6:
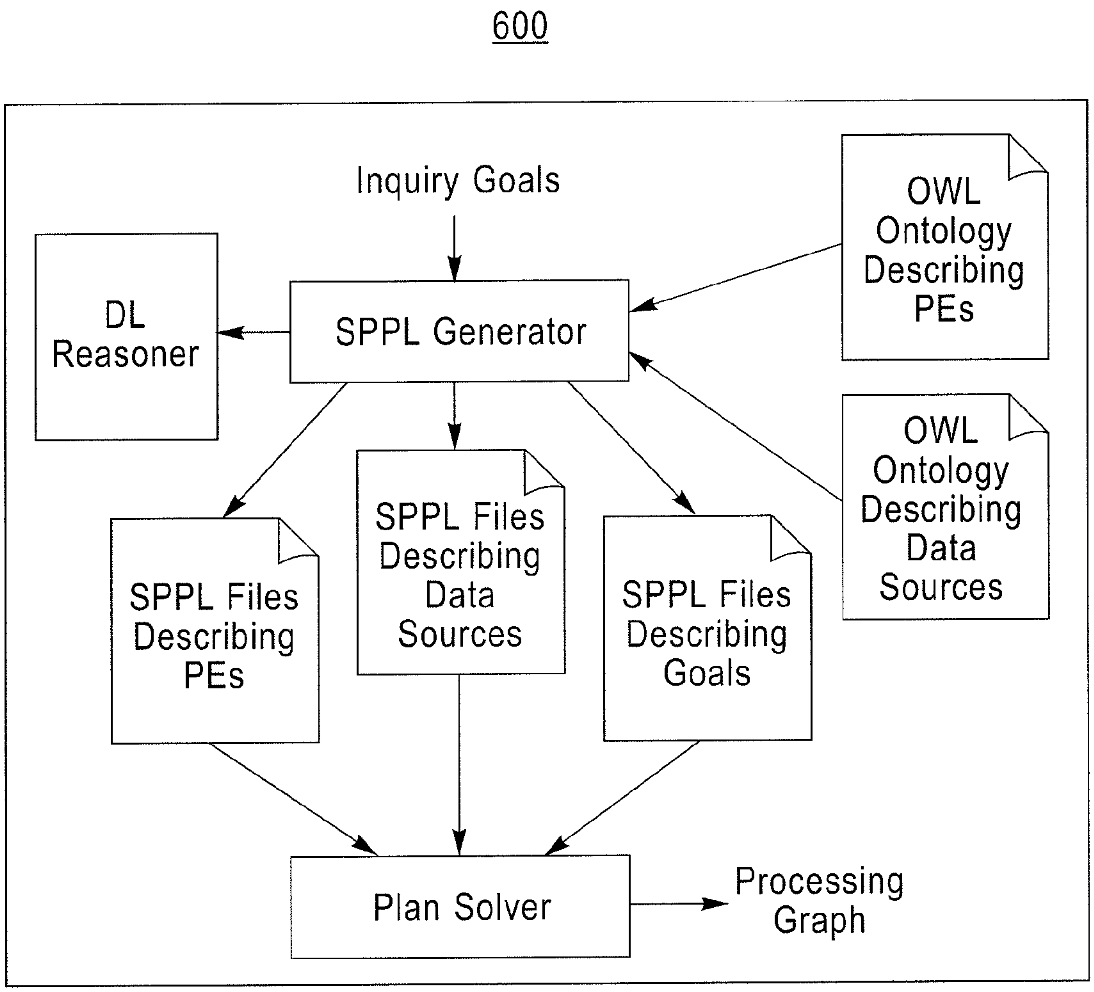
FIG. 6 illustrates a semantic planner according to an exemplary embodiment of the present invention.

As shown in FIG. 6, a semantic planner 600 consists of three main components: a Stream Processing Planning Language (SPPL) Generator, a DL Reasoner and a Plan Solver. The SPPL Generator takes OWL files describing software components and data sources and compiles them into a planning domain represented in the intermediate language SPPL as described, for example, in A. Riabov, Z. Liu, Planning for Stream Processing Systems, in Proceeding of AAAI-2005, July 2005, a copy of which is incorporated by reference herein in its entirety.

The SPPL Generator makes use of the DL Reasoner to make inferences about the software component descriptions and inserts these inferences as facts into the domain description. In addition to semantic descriptions of inputs and outputs, the planning domain also includes descriptions of other compositional/operational constraints such as security and privacy constraints. In addition to creating the domain file, the SPPL Generator translates each stream query into a goal description in SPPL. The Plan Solver then parses the generated domain and problem SPPL files and produces optimal plans using a backward-chaining branch and bound algorithm as described, for example, A. Riabov, Z. Liu, Planning for Stream Processing Systems, in Proceeding of AAAI-2005, July 2005. The Plan Solver solves the graph embedding problem by deducing appropriate mappings of variables in the input graph to nodes in the output graph. In this planning process multi-objective optimization is carried out including, for example, computational cost and result quality. A Minerva Reasoner, which is a highly scalable reasoner, operating on a description logic program (DLP), which is an expressive subset of DL, may be used as the DL Reasoner.

When the planner 600 is given a processing request, the planner 600 searches for multiple alternative plans, visiting software component descriptions and traversing potentially large associated input and output description graphs many times. Incurring the overhead of DL reasoning on each visit could have a huge negative impact on performance. This is overcome by adopting a two-phase approach, performing a priori reasoning over graphs of asserted and inferred facts, caching expanded graphs for later use during query compilation. Because the products of the reasoning have been cached, no DL reasoning need be used while searching for viable processing graphs.

Figure 7A:
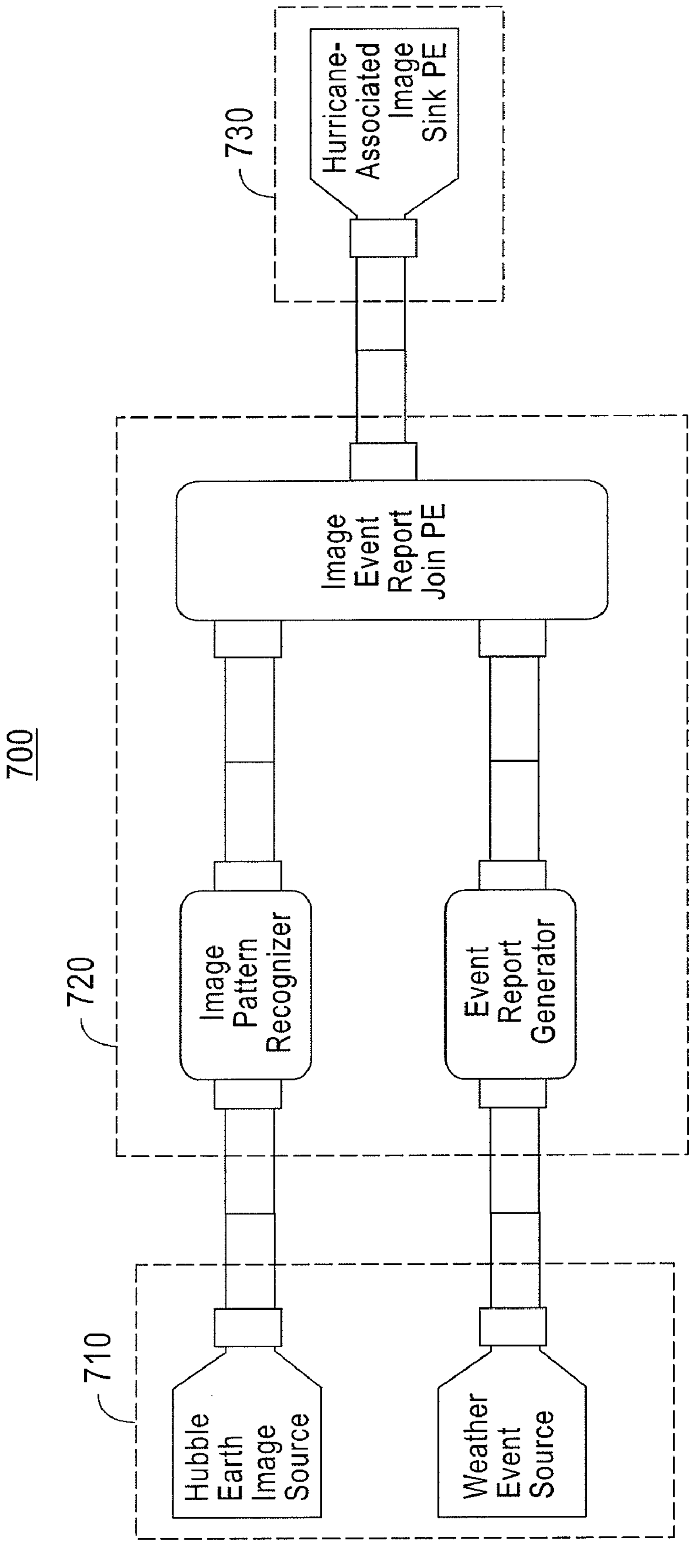
FIG. 7A illustrates a processing graph assembled according to an exemplary embodiment of the present invention.
Figure 7B:
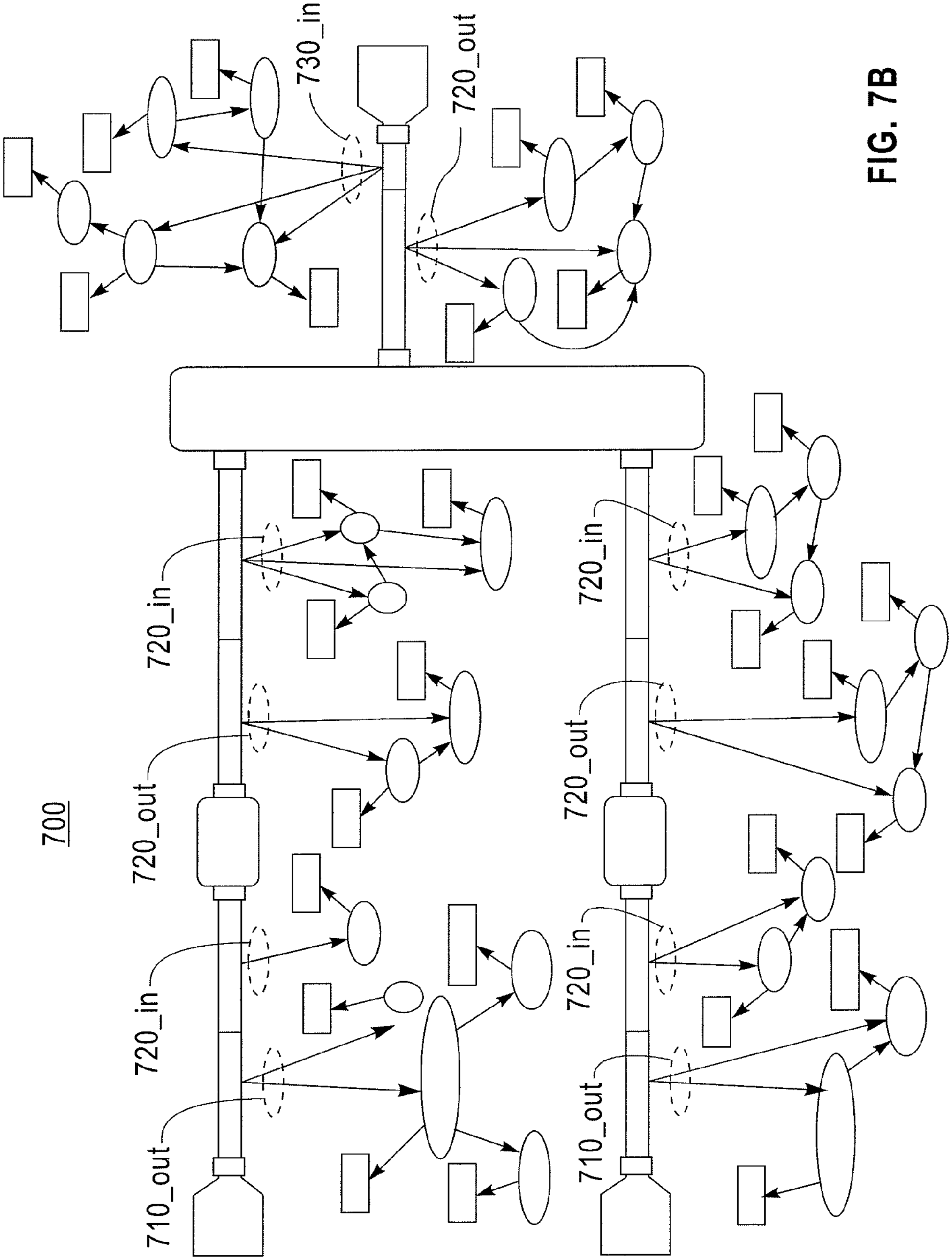
FIG. 7B illustrates the processing graph of FIG. 7A with semantic annotations according to an exemplary embodiment of the present invention.

An example of a processing graph 700 assembled by the semantic planner 600 in response to a request for hurricane associated images is shown in FIG. 7A. It is to be understood that although only one processing graph is shown in FIG. 7A, the semantic planner 600 can assemble several alternative processing graphs. The processing graph 700 shown in FIG. 7A draws on two data sources 710 feeding three operators/components 720 to produce a sink including hurricane-associated images 730 (e.g., images that contain possible storm pattern and images that were taken around that same time a hurricane was reported). FIG. 7B depicts the same processing graph as shown in FIG. 7A; however, here, semantic graphs describing each data source's outputs 710_out, each component's inputs 720_in and outputs 720_out and the sink's inputs 730_in are provided.

As can be gleaned from a review of FIG. 7B, it can be difficult to select from among a large set of data sources and software components to compose such a graph manually. For example, even with the relatively small number of operators depicted in the processing graph 700, the work needed to identify appropriate elements and to match outputs to inputs can be daunting, especially for matches requiring reasoning. Since most processing graphs involve many more operators, manual composition of even one graph is tedious and manual composition of multiple, alternative processing graphs is impracticable. Hence, automated compilation approaches such as planning are essential for compiling processing requests into processing graphs.

Figure 8A:
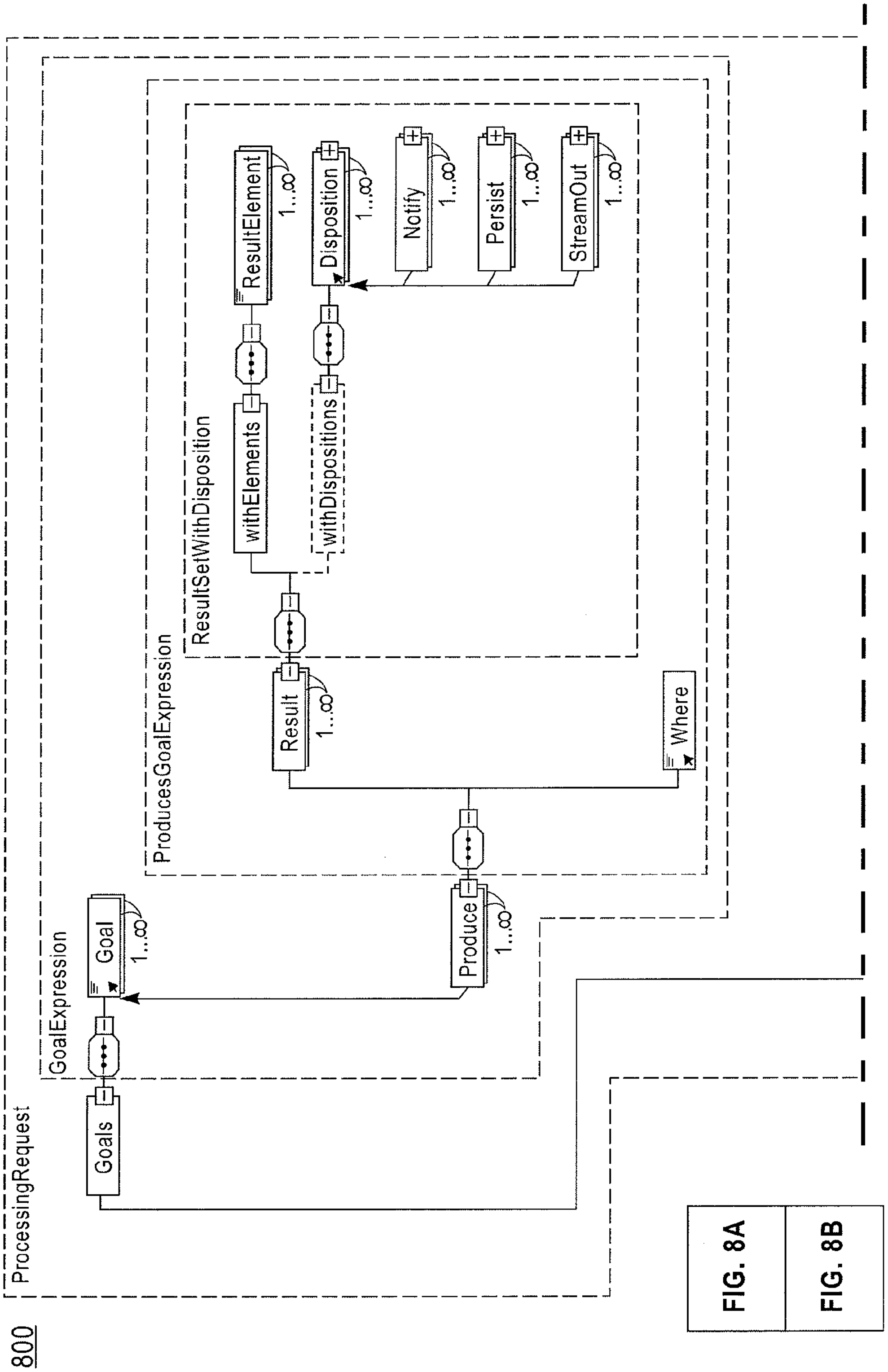
FIG. 8 illustrates an XML Schema syntax of a Processing Request Specification Language (PRSL) according to an exemplary embodiment of the present invention.
Figure 8B:
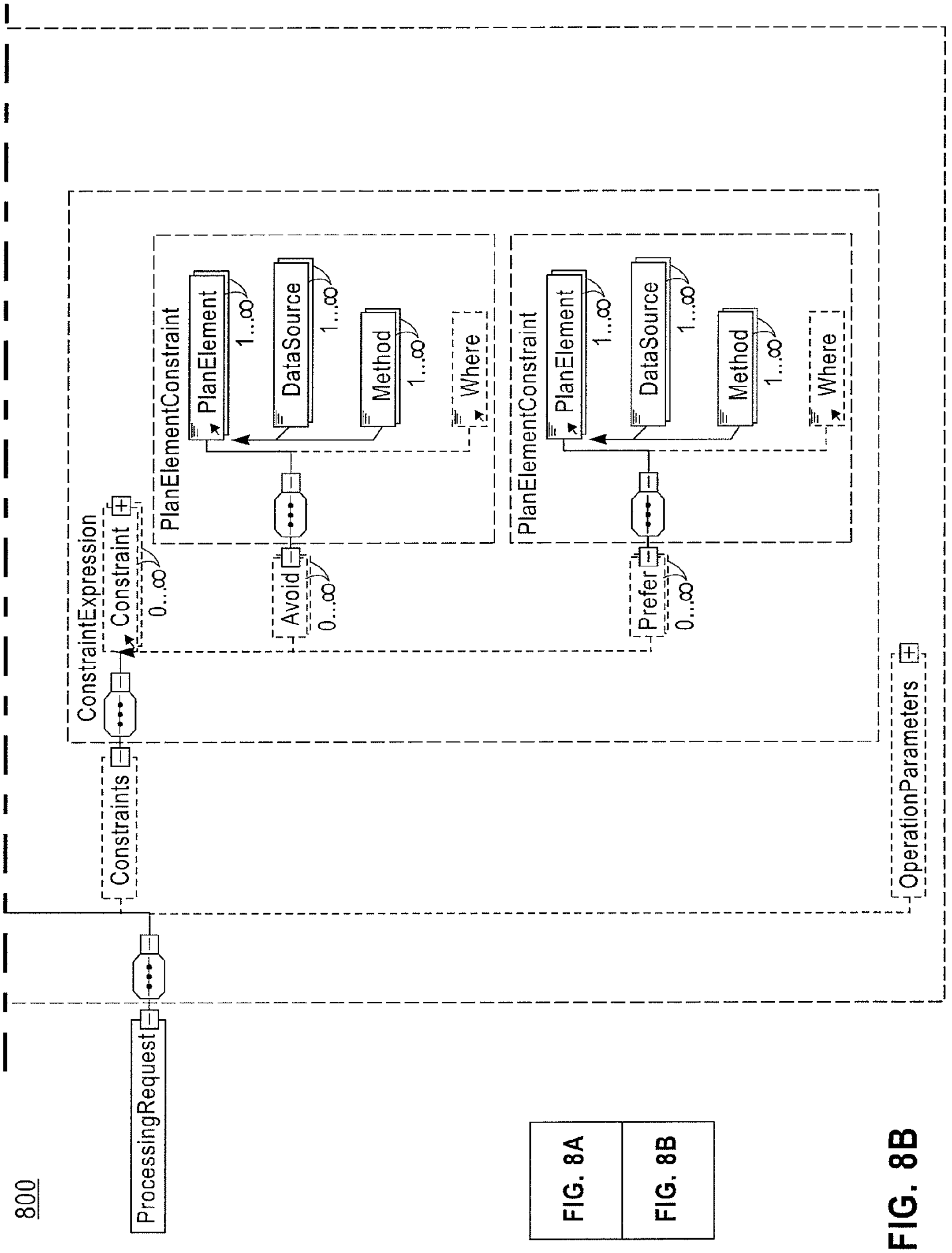

FIG. 8 illustrates an XML Schema syntax 800 of a Processing Request Specification Language (PRSL) according to an exemplary embodiment of the present invention. Below is the XML Schema definition for an XML syntax of the PRSL. It is to be understood that XML documents conveying processing request specifications are encoded according to the syntax defined in the PRSL XML Schema.

```
<xs:schema
targetNamespace=“http://www.ibm.com/research/distillery/inq/isl/1.0”
xmlns=“http://www.ibm.com/research/distillery/inq/isl/1.0”
xmlns:xs=“http://www.w3.org/2001/XMLSchema” elementFormDefault=“qualified”
attributeFormDefault=“unqualified”>
    <xs:element name=“ProcessingRequest”type=“ProcessingRequest”>
        <xs:annotation>
            <xs:documentation>The processing request described by this ISL
specification.</xs:documentation>
        </xs:annotation>
    </xs:element>
    </xs:complexType name=“ProcessingRequest”>
        <xs:annotation>
            <xs:documentation>The type for a processing request
specification.</xs:documentation>
        </xs:annotation>
        <xs:sequence>
            <xs:element name=“Goals” type=“GoalExpression”/>
            <xs:element name=“Constraints” type=“ConstraintExpression”
minOccurs=“0”/>
            <xs:element name=“OperationalParameters”
type=“OperationalParameters” minOccurs=“0”>
                <xs:annotation>
                    <xs:documentation>Items passed to the planner(s) and/or the runtime,
providing values/functions needed to plan/shcedule/deploy the processing request. Limited
set for ISL 1.0 - to expand as knowledge of paramenters</xs:documentation>
                </xs:annotation>
            </xs:element>
```

-continued

```
        </xs:sequence>
        <xs:attribute name="comment" type="xs:string"/>
        <xs:attribute name="name" type="xs:string" use="required"/>
      </xs:complexType>
      <xs:element name="Goal" type="ProcessingRequestGoal" abstract="true">
        <xs:annotation>
          <xs:documentation>Abstract element. To be substituted by any defined
type of goal element.</xs:documentation>
      </xs:annotation>
   </xs:element>
   <xs:complexType name="ProcessingRequestGoal" abstract="true">
      <xs:annotation>
        <xs:documentation>Base type for processing request goals. Abstract,
intended to be extended.</xs:documentation>
      </xs:annotation>
   </xs:complexType>
   <xs:complexType name="GoalExpression">
      <xs:annotation>
        <xs:documentation>Making room for a richer goal expression language.
FOr now, simply a conjunction of goals.</xs:documentation>
      </xs:annotation>
      <xs:sequence>
        <xs:annotation>
          <xs:documentation>Conjoined (ANDed) goals. Conjunction will suffice
for our current planning needs. We may need to consider full boolean expxressions to
express various goal combinations, and/or preference weighting to convey semantics other
than conjoined non-optional goals. </xs:documentation>
        </xs:annotation>
        <xs:element ref="Goal" maxOccurs="unbounded"/>
      </xs:sequence>
   </xs:complexType>
   <xs:complexType name="GraphPattern">
      <xs:annotation>
        <xs:documentation>Any graph pattern, expressed in some interpretable
language. For ISL1.0, it's SPARQL WHERE graph patterns.</xs:documentation>
      </xs:annotation>
      <xs:simpleContent>
        <xs:extension base="xs:string"/>
      </xs:simpleContent>
   </xs:complexType>
   <xs:complexType name="BooleanExpression">
      <xs:annotation>
        <xs:documentation>Any boolean expression, expressed in some
interpretable language. For ISL 1.0, it's the SPARQL FILTER Expression sublanguage.
</xs:documentation>
      </xs:annotation>
      <xs:simpleContent>
        <xs:extension base="xs:string"/>
      </xs:simpleContent>
   </xs:complexType>
   <xs:element name="PlanElement" type="PlanElement" abstract="true">
      <xs:annotation>
        <xs:documentation>Abstract element for constrained Plan elements. To be
substituted by specific kinds of plan elements (e.g., DataSource,
Method).</xs:documentation>
      </xs:annotation>
   </xs:element>
   </xs:complexType name="PlanElementConstraint">
      <xs:sequence>
        <xs:element ref="PlanElement" maxOccurs="unbounded"/>
        <xs:element ref="Where" minOccurs="0"/>
      </xs:sequence>
      <xs:attribute name="weight" type="xs:decimal" use="required"/>
   </xs:complexType>
   <xs:element name="Where" type="GraphPattern">
      <xs:annotation>
        <xs:documentation>The graph pattern providing the semantic description
of the named elements (variables) above. </xs:documentation>
      </xs:annotation>
   </xs:element>
   <xs:complexType name="ResultDisposition">
      <xs:sequence>
        <xs:element name="if" type="BooleanExpression" minOccurs="0"/>
      </xs:sequence>
   </xs:complexType>
   <xs:complexType name="Notification">
      <xs:complexContent>
        <xs:extension base="ResultDisposition">
          <xs:sequence>
            <xs:element name="Recipient" minOccurs="0"
```

-continued

```
maxOccurs="unbounded">
                <xs:annotation>
                    <xs:documentation>Recipients specified in the processing
request, providing initial set of subscribers to notification. Others could be added (subject
to credential-clearining planning), and any can be removed.</xs:documentation>
                </xs:annotation>
                <xs:complexType>
                    <xs:sequence>
                        <xs:element name="UserName" type="xs:string"
minOccurs="0"/>
                        <xs:element name="mBox" type="xs:anyURI"/>
                    </xs:sequence>
                </xs:complexType>
            </xs:element>
            <xs:element name="Priority" type="xs:decimal" minOccurs="0"/>
            <xs:element name="MessageString" type="xs:string"
minOccurs="0"/>
          </xs:sequence>
          </xs:extension>
        </xs:complexContent>
    </xs:complexType>
    <xs:element name="Disposition" type="ResultDisposition" abstract="true">
        <xs:annotation>
            <xs:documentation>Plugins for various types of result
disposition</xs:documentation>
        </xs:annotation>
    </xs:element>
    <xs:element name="Notify" substitutionGroup="Disposition">
        <xs:annotation>
            <xs:documentation>Send all ResultElements to external notification
service.
    Notificiation mechanism TBD . If external, ResultElementSet required to carry all
variables in notify "if" clause.</xs:documentation>
        </xs:annotation>
        <xs:complexType>
            <xs:complexContent>
                <xs:extension base="Notification"/>
            </xs:complexContent>
        </xs:complexType>
    </xs:element>
    <xs:element name="Export" type="ExportDisposition">
        <xs:annotation>
            <xs:documentation>ISL 2.0: Export from SPC - no presumption of
retention - simply export. Valid?</xs:documentation>
        </xs:annotation>
    </xs:element>
    <xs:complexType name="ExportDisposition">
        <xs:complexContent>
            <xs:extension base="ResultDisposition"/>
        </xs:complexContent>
    </xs:complexType>
    <xs:element name="Disposition2.0" type="ResultDisposition"/>
    <xs:element name="ExportToDB" type="ExportToDBDisposition"
substitutionGroup="Disposition2.0">
        <xs:annotation>
            <xs:documentation>ISL 2.0:Store all ResultElements to external
DB</xs:documentation>
        </xs:annotation>
    </xs:element>
    <xs:element name="Produce" type="ProducesGoalExpression"
substitutionGroup="Goal">
        <xs:annotation>
            <xs:documentation>The primary means of identifying the data to be
sought/produced by and processing request, since Distillery's raison d'etre is streaming
data analysis.</xs:documentation>
        </xs:annotation>
    </xs:element>
    <xs:element name="PersistWithNotification" type="PersistWithNotification"/>
    <xs:complexType name="PersistWithNotification">
        <xs:complexContent>
            <xs:extension base="Notification">
                <xs:sequence>
                    <xs:element name="RetentionValue" type="RetentionValue"/>
                </xs:sequence>
            </xs:extension>
        </xs:complexContent>
    </xs:complexType>
    <xs:element name="Constraint" type="PlanElementConstraint"
abstract="true">
        <xs:annotation>
```

-continued

```
            <xs:documentation>Abstract element capturing the constraint type.
Specific constraint types substitute for this element.</xs:documentation>
         </xs:annotation>
      </xs:element>
      <xs:element name=“Avoid” type=“PlanElementConstraint”
substitutionGroup=“Constraint”>
         <xs:annotation>
            <xs:documentation>Avoid the plan element(s) described within.
</xs:documentation>
         </xs:annotation>
      </xs:element>
      <xs:element name=“Prefer” type=“PlanElementConstraint”
substitutionGroup=“Constraint”>
         <xs:annotation>
            <xs:documentation>Prefer the plan elements defined within
</xs:documentation>
         </xs:annotation>
      </xs:element>
      <xs:complexType name=“ResultSetWithDisposition”>
         <xs:sequence>
            <xs:element name=“withElements”>
               <xs:annotation>
                  <xs:documentation>Set of elements comprising a complete result set.
If a result set with more or fewer elements is needed, create another.
   Post 1.0: optional elements</xs:documentation>
               </xs:annotation>
               <xs:complexType>
               <xs:sequence>
                  <xs:element name=“ResultElement” type=“VariableName”
maxOccurs=“unbounded”>
                     <xs:annotation>
                        <xs:documentation>Each element corresponds to a variable in
the Where clause.</xs:documentation>
                     </xs:annotation>
                  </xs:element>
               </xs:sequence>
            </xs:complexType>
         </xs:element>
         <xs:element name=“withDispositions” minOccurs=“0”
            <xs:annotation>
               <xs:documentation>Result Dispositions are the handling of result sets.
To get results to be, e.g., persisted, notified, etc., apply one or more dispositions. This set is
extensible, based on the kinds of dispositions defined for the
application.</xs:documentation>
            </xs:annotation>
            <xs:complexType>
               <xs:sequence>
                  <xs:element ref=“Disposition” maxOccurs=“unbounded”/>
               </xs:sequence>
            </xs:complexType>
         </xs:element>
      </xs:sequence>
   </xs:complexType>
   <xs:complexType name=“RetentionValue”>
      <xs:simpleContent>
         <xs:extension base=“xs:decimal”/>
      </xs:simpleContent>
   </xs:complexType>
   <xs:complexType name=“ProducesGoalExpression”>
      <xs:complexContent>
         <xs:extension base=“ProcessingRequestGoal”>
            <xs:sequence>
               <xs:element name=“Result” maxOccurs=“unbounded”>
                  <xs:complexType>
                     <xs:complexContent>
                        <xs:extension base=“ResultSetWithDisposition”>
                           <xs:attribute name=“comment” type=“xs:string”
use=“optional”/>
                        </xs:extension>
                     </xs:complexContent>
                  </xs:complexType>
               </xs:element>
               <xs:element ref=“Where”/>
            </xs:sequence>
         </xs:extension>
      </xs:complexContent>
   </xs:complexType>
   <xs:element name=“DataSource” substitutionGroup=“PlanElement”>
      <xs:annotation>
         <xs:documentation>Named Data Source to be avoided or preferred in the
```

processing request. The name is a variable (?DS1), which is defined in the Where clause</xs:documentation>
      </xs:annotation>
      <xs:complexType>
        <xs:simpleContent>
          <xs:restriction base="PlanElement"/>
        </xs:simpleContent>
      </xs:complexType>
    </xs:element>
    <xs:element name="Method" type="PlanElement" substitutionGroup="PlanElement">
      <xs:annotation>
        <xs:documentation>Named Method (PE or collection of PEs) to be avoided or preferred in the processing request. The name is a variable (?ME1), which is defined in the Where clause</xs:documentation>
      </xs:annotation>
    </xs:element>
    <xs:complexType name="PlanElement">
      <xs:simpleContent>
        <xs:extension base="xs:string"/>
      </xs:simpleContent>
    </xs:complexType>
    <xs:complexType name="ExportToDBDisposition">
      <xs:complexContent>
        <xs:extension base="ExportDisposition">
          <xs:sequence>
            <xs:element name="StoreToDBScript" type="xs:string">
              <xs:annotation>
                <xs:documentation>May contain references to ResultElement variables, which would need binding prior to execution.</xs:documentation>
              </xs:annotation>
            </xs:element>
          </xs:sequence>
        </xs:extension>
      </xs:complexContent>
    </xs:complexType>
    <xs:element name="Persist" type="PersistDisposition" substitutionGroup="Disposition">
      <xs:annotation>
        <xs:documentation>ISL 1.0:
  Assume default result persistence for results. This disposition provides a means of overriding default persistence and retention attributes (as defined in JDL).
  Should eventually be policy-driven.
  With experience we can abstract this to more general disposition statements, such as AdjustRetention and SetRetention.</xs:documentation>
      </xs:annotation>
    </xs:element>
    <xs:complexType name="PersistDisposition">
      <xs:complexContent>
        <xs:extension base="ResultDisposition">
          <xs:sequence>
            <xs:element name="for" type="xs:duration"/>
            <xs:element name="RetentionAttributes" type="xs:string" minOccurs="0"/>
          </xs:sequence>
        </xs:extension>
      </xs:complexContent>
    </xs:complexType>
    <xs:simpleType name="VariableName">
      <xs:restriction base="xs:string">
        <xs:pattern value="\?[A-Za-zÀ-ÖØ-öø-˿Ͱ-ͽͿ-῿‌-‍⁰-↏Ⰰ-⿯、-퟿豈-﷏ﷰ-�][A-Za-z0-9\-_·̀-ͯ‿-⁀À-ÖØ-öø-˿Ͱ-ͽͿ-῿‌-‍⁰-↏Ⰰ-⿯、-퟿豈-﷏ﷰ-�]*"/>
      </xs:restriction>
    </xs:simpleType>
    <xs:complexType name="ConstraintExpression">
      <xs:sequence>
        <xs:element ref="Constraint" minOccurs="0" maxOccurs="unbounded"/>
      </xs:sequence>
    </xs:complexType>
    <xs:complexType name="OperationalParameters">
      <xs:sequence>
        <xs:element name="RiskMax" type="xs:nonNegativeInteger" minOccurs="0">
          <xs:annotation>

-continued

```
<xs:documentation>The maximum risk allowable for this processing
request. </xs:documentation>
          <xs:annotation>
        </xs:element>
        <xs:element name="ResourceUtilizationMax"
type="xs:nonNegativeInteger" minOccurs="0">
          <xs:annotation>
            <xs:documentation>The maximum resource utilization for this
processing request</xs:documentation>
          </xs:annotation>
        </xs:element>
      </xs:sequence>
    </xs:complexType>
    </xs:element name="StreamOut" type="StreamOutDisposition"
substitutionGroup="Disposition"/>
    <xs:complexType name="StreamOutDisposition">
      <xs:complexContent>
        <xs:extension base="ResultDisposition">
          <xs:sequence>
            <xs:element name="Destination" maxOccurs="unbounded">
              <xs:complexType>
                <xs:sequence>
                  <xs:element name="Host" type="xs:string"/>
                  <xs:element name="Port" type="xs:integer"
maxOccurs="unbounded"/>
                </xs:sequence>
              </xs:complexType>
            </xs:element>
          </xs:sequence>
        </xs:extension>
      </xs:complexContent>
    </xs:complexType>
  </xs:schema>
```

In accordance with an exemplary embodiment of the present invention, a means of describing processing outcomes in such a way that information processing applications that satisfy these requests can be generated is provided. In this way, software applications can be assembled more dynamically (in seconds or minutes as opposed to days or months), taking into account many more considerations (security, privacy, resource availability and consumption, etc.) than most users could fathom, let alone have the time or patience to accommodate. A key characteristic of the request specification method is its emphasis on goal specification.

By using the present invention a user can describe solely the intended processing outcome, not needing to know nor be required to express the details of how the processing outcome is to be fulfilled. The method has the effect of preventing over-specification of processing requests. Thus, an application planner can discover better ways of accommodating the request, better data sources to draw from, better algorithms to apply, and the assembly of more effective and/or efficient applications than the requester might envision. Here, users need only describe their requests and convey their constraints (if any) on how the request is to be fulfilled, and need a mechanism, preferably automated, whereby various ways to fulfill their request can be generated, compared, pruned, and applied.

By providing a means of conveying the goals for processing outcome and doing so using semantic descriptions built according to an explicitly represented semantic model, the user is freed from the burden of knowing and applying some set of operators to produce some outcome. This allows the work of two different groups of people, those conveying their request and those developing and describing application components, to proceed in parallel. The present invention makes this possible by allowing the first group to convey their requests without having any knowledge of which data sources or processing methods are available for use or how they must be assembled. Request specifications are semantically described, expressed by graph patterns represented as triple patterns, describing both the goal of the processing request and the constraints on the resultant processing graphs. Expressivity is similar to that of the SPARQL RDF query language, a language used to encode the triple patterns. Request specifications are different from SPARQL queries in that they express outcomes beyond those of information production (i.e., not just queries), and are used not as input to a query processor but for matching the outcomes to components in automatically assembled processing graphs.

It should be understood that the present invention may be implemented in various forms of hardware, software, firmware, special purpose processors, or a combination thereof. In one embodiment, the present invention may be implemented in software as an application program tangibly embodied on a program storage device (e.g., magnetic floppy disk, RAM, CD ROM, DVD, ROM, and flash memory). The application program may be uploaded to, and executed by, a machine comprising any suitable architecture.

It is to be further understood that because some of the constituent system components and method steps depicted in the accompanying figures may be implemented in software, the actual connections between the system components (or the process steps) may differ depending on the manner in which the present invention is programmed. Given the teachings of the present invention provided herein, one of ordinary skill in the art will be able to contemplate these and similar implementations or configurations of the present invention.

It should also be understood that the above description is only representative of illustrative embodiments. For the convenience of the reader, the above description has focused on a representative sample of possible embodiments, a sample that is illustrative of the principles of the invention. The description has not attempted to exhaustively enumerate all possible variations. That alternative embodiments may not have been presented for a specific portion of the invention, or that further undescribed alternatives may be available for a portion, is not to be considered a disclaimer of those alternate embodiments. Other applications and embodiments can be implemented without departing from the spirit and scope of the present invention.

It is therefore intended, that the invention not be limited to the specifically described embodiments, because numerous permutations and combinations of the above and implementations involving non-inventive substitutions for the above can be created, but the invention is to be defined in accordance with the claims that follow. It can be appreciated that many of those undescribed embodiments are within the literal scope of the following claims, and that others are equivalent.

What is claimed is:

1. A method for constructing a processing request so that an information processing application satisfying the processing request can be assembled, comprising:

inputting a processing request, wherein the processing request includes a goal that is represented by a graph pattern that semantically describes a desired processing outcome, and assembling a processing graph that includes at least one component that satisfies the desired processing outcome, wherein the processing graph is assembled by associating the graph pattern that semantically describes the desired processing outcome with a graph pattern that semantically describes an applicability condition of the at least one component, wherein the association between the graph pattern that semantically describes the desired processing outcome and the graph pattern that semantically describes an applicability condition of the at least one component is based on a determination, which is performed during the assembly of the processing graph, that the at least one component is permitted to receive data produced by part of the processing graph as input, wherein the processing request further includes a constraint that is represented by a graph pattern that semantically describes constraints on the components to be used in the assembly of the processing graph and the determination that the at least one component is permitted to receive data produced by part of the processing graph as input is made in response to the applicability condition of the at least one component satisfying the constraints, and wherein the method is performed using a processor;

wherein the method further comprises: deploying an information processing application embodying the at least one component of the processing graph; and operating the information processing application; wherein result data is produced when operating the information processing application;

wherein when the goal is a goal that requests the production of data, the result data includes an element that is a requested data item.

2. The method of claim 1, wherein the processing request is encoded in a request specification language.

3. The method of claim 1, wherein the goal is a goal that requests production of data, a goal that requests an update of retained state information, a goal that requests installation of a component or a goal that requests removal of a component.

4. The method of claim 1 , wherein the result data is an end result of the operated information processing application or an intermediate result of the operated information processing application, wherein the intermediate result is an inclusion effect of the at least one component of the processing graph.

5. The method of claim 1 , wherein the element is expressed as a variable.

6. The method of claim 5, wherein the element is defined in a where clause.

7. The method of claim 6, wherein the where clause explicitly references the variable.

8. The method of claim 6, wherein the where clause includes an assertion that constrains a type of data item acceptable as an element.

9. The method of claim 8, wherein the assertion refers to a class description in an ontology.

10. The method of claim 1, wherein when the goal is a goal that requests the production of data, the processing request further includes a disposition that semantically describes a means of handling the result data.

11. The method of claim 10, wherein the disposition includes a condition expression that defines a condition under which the disposition is to occur.

12. The method of claim 11, wherein the condition expression is a Boolean expression.

13. The method of claim 10, wherein the disposition indicates that the result data is to be conveyed to a network destination, the result data is to be retained for further processing, the result data is available for retrieval or the result data is to be conveyed to an external data store.

14. The method of claim 1, wherein the constraint establishes a preference on the inclusion of an algorithm or a component that is to be included in the processing graph or the interconnection of components in the processing graph.

15. The method of claim 1, wherein the constraint is a hard constraint or a soft constraint.

16. The method of claim 1, wherein the processing request further includes an outcome response that is represented by a graph pattern that semantically describes an action to be taken upon achievement of the desired processing outcome.

17. The method of claim 16, wherein the outcome response includes a condition under which the action is to be taken.

18. The method of claim 16, wherein when the goal is a goal that requests the production of data, the graph pattern that semantically describes an action to be taken upon achievement of the desired processing outcome further describes a means of handling result data that is produced when operating an information processing application embodying the at least one component after the information processing application has been deployed.

19. The method of claim 1, wherein the applicability condition of the component is a semantic description of criteria that must be satisfied in order to include the component into the processing graph.

20. The method of claim 1, wherein the processing graph is further assembled by associating the graph pattern that semantically describes the desired processing outcome with a graph pattern that semantically describes an inclusion effect of the at least one component, wherein the inclusion effect of the component is a semantic description of an effect of including the component in the processing graph.

21. A system for constructing a processing request so that an information processing application satisfying the processing request can be assembled, comprising:

a memory device for storing a program; a processor in communication with the memory device, the processor operative with the program to:

receive and compile a processing request, wherein the processing request includes a goal that is represented by a graph pattern that semantically describes a desired processing outcome; and assemble a processing graph that includes at least one component that satisfies the desired processing outcome, wherein the processing graph is assembled by associating the graph pattern that semantically describes the desired processing outcome with a graph pattern that semantically describes an input requirement of the at least one component, wherein the input requirement includes variables representing objects that must be included in a pre-inclusion state and the graph pattern that semantically describes the input requirement semantically describes the objects that must be included in the pre-inclusion state, wherein the pre-inclusion state is a state against which the applicability of the at least one component for inclusion in the processing graph is evaluated and wherein the graph pattern that semantically describes the objects that must be included in the pre-inclusion state includes triple patterns;

wherein the processor is further operative with the program to:

deploy an information processing application embodying the at least one component of the processing graph; and operate the information processing application;

wherein result data is produced when operating the information processing application;

wherein when the goal is a goal that requests the production of data, the result data includes an element that is a requested data item.

22. A computer program product comprising a program storage device having computer program logic recorded thereon for constructing a processing request so that an information processing application satisfying the processing request can be assembled, the computer program logic comprising:

program code for receiving and compiling a processing request, wherein the processing request includes a goal that is represented by a graph pattern that semantically describes a desired processing outcome; and program code for assembling a processing graph that includes at least one component that satisfies the desired processing outcome, wherein the processing graph is assembled by associating the graph pattern that semantically describes the desired processing outcome with a graph pattern that semantically describes an applicability condition of the at least one component, wherein the association between the graph pattern that semantically describes the desired processing outcome and the graph pattern that semantically describes an applicability condition of the at least one component is based on a determination, which is performed during the assembly of the processing graph, that the at least one component is permitted to receive data produced by part of the processing graph as input, and wherein the processing request further includes a constraint that is represented by a graph pattern that semantically describes constraints on the components to be used in the assembly of the processing graph and the determination that the at least one component is permitted to receive data produced by part of the processing graph as input is made in response to the applicability condition of the at least one component satisfying the constraints;

wherein the computer program logic further comprises:

program code for deploying an information processing application embodying the at least one component of the processing graph; and program code for operating the information processing application; wherein result data is produced when operating the information processing application;

wherein when the goal is a goal that requests the production of data, the result data includes an element that is a requested data item.

* * * * *